US012387096B2

(12) United States Patent
Saharia et al.

(10) Patent No.: US 12,387,096 B2
(45) Date of Patent: Aug. 12, 2025

(54) IMAGE-TO-IMAGE MAPPING BY ITERATIVE DE-NOISING

(71) Applicant: Google LLC, Mountain View, CA (US)

(72) Inventors: Chitwan Saharia, Toronto (CA); Mohammad Norouzi, Toronto (CA); William Chan, Toronto (CA); Huiwen Chang, New York, NY (US); David James Fleet, Toronto (CA); Christopher Albert Lee, Manhattan, NY (US); Jonathan Ho, New York, NY (US); Tim Salimans, Utrecht (NL)

(73) Assignee: Google LLC, Mountain View, CA (US)

( * ) Notice: Subject to any disclaimer, the term of this patent is extended or adjusted under 35 U.S.C. 154(b) by 491 days.

(21) Appl. No.: 17/938,139

(22) Filed: Oct. 5, 2022

(65) Prior Publication Data

US 2023/0103638 A1 Apr. 6, 2023

Related U.S. Application Data

(60) Provisional application No. 63/253,126, filed on Oct. 6, 2021.

(51) Int. Cl.
*G06N 3/08* (2023.01)
*G06V 10/80* (2022.01)
*G06V 10/82* (2022.01)

(52) U.S. Cl.
CPC ............. *G06N 3/08* (2013.01); *G06V 10/80* (2022.01); *G06V 10/82* (2022.01)

(58) Field of Classification Search
CPC .......... G06N 3/08; G06N 3/045; G06N 3/084; G06V 10/80; G06V 10/82; G06V 10/454; G06V 10/30
See application file for complete search history.

(56) References Cited

U.S. PATENT DOCUMENTS

2022/0398697 A1* 12/2022 Vahdat ................ G06N 3/0464
2022/0405583 A1* 12/2022 Vahdat ................ G06N 3/0464
(Continued)

OTHER PUBLICATIONS

Yan Z, Liu S, Gu H. Fault image enhancement using a forward and backward diffusion method. Computers & Geosciences. Oct. 1, 2019;131:1-4. (Year: 2019)*

(Continued)

*Primary Examiner* — Fayyaz Alam
(74) *Attorney, Agent, or Firm* — McDonnell Boehnen Hulbert & Berghoff LLC

(57) ABSTRACT

A method includes receiving training data comprising a plurality of pairs of images. Each pair comprises a noisy image and a denoised version of the noisy image. The method also includes training a multi-task diffusion model to perform a plurality of image-to-image translation tasks, wherein the training comprises iteratively generating a forward diffusion process by predicting, at each iteration in a sequence of iterations and based on a current noisy estimate of the denoised version of the noisy image, noise data for a next noisy estimate of the denoised version of the noisy image, updating, at each iteration, the current noisy estimate to the next noisy estimate by combining the current noisy estimate with the predicted noise data, and determining a reverse diffusion process by inverting the forward diffusion process to predict the denoised version of the noisy image. The method additionally includes providing the trained diffusion model.

26 Claims, 20 Drawing Sheets
(5 of 20 Drawing Sheet(s) Filed in Color)

(56) References Cited

U.S. PATENT DOCUMENTS

| | | | | |
|---|---|---|---|---|
| 2023/0067841 A1* | 3/2023 | Saharia | ............... | G06N 3/047 |
| 2023/0108422 A1* | 4/2023 | Brauer | ............... | G06N 3/0464 |
| | | | | 702/2 |
| 2023/0109379 A1* | 4/2023 | Kreis | ............... | G06N 3/047 |
| | | | | 382/157 |
| 2023/0408612 A1* | 12/2023 | Zhang | ............... | G01R 33/4836 |

OTHER PUBLICATIONS

Chen Y, Yu W, Pock T. On learning optimized reaction diffusion processes for effective image restoration. InProceedings of the IEEE conference on computer vision and pattern recognition 2015 (pp. 5261-5269). (Year: 2015).*

Wang Y, Zhang L, Li P. Local variance-controlled forward-and-backward diffusion for image enhancement and noise reduction. IEEE Transactions on Image Processing. Jun. 18, 2007;16(7):1854-64. (Year: 2007).*

Gilboa G, Sochen N, Zeevi YY. Forward-and-backward diffusion processes for adaptive image enhancement and denoising. IEEE transactions on image processing. Jul. 2002;11(7):689-703. (Year: 2002).*

Chen, Nanxin, "WaveGrad: Estimating Gradients for Waveform Generation," arXiv:2009.00713v2, Oct. 9, 2020, 15 pages.

Ho, Jonathan, "High Fidelity Image Generation Using Diffusion Models," Google AI Blog, https://ai.googleblog.com/2021/07/high-fidelity-image-generation-using.html, Jul. 16, 2021, 6 pages.

Saharia et al., "Image Super-Resolution via Iterative Refinement," arXiv:2104.07636v2, Jun. 30, 2021, 28 pages.

Saharia et al., "Palette: Image-to-Image Diffusion Models," arXiv:2111.05826v2, May 3, 2022, 29 pages.

Saharia et al., United States Patent & Trademark Office, U.S. Appl. No. 17/391,150, filed Aug. 2, 2021, 69 pages.

* cited by examiner

|  | FID-5K | IS | CA | PD | Fool Rate |
|---|---|---|---|---|---|
| 4R1 | pix2pix | 24.41 | - | - | - | - |
| 4R2 | PixColor | 24.32 | - | - | - | 29.90% |
| 4R3 | Coltran | 19.37 | - | - | - | 36.55% |
| 4R4 | Regression | 17.89 | 169.8 | 68.20% | 60 | 39.45% |
| 4R5 | Palette | 15.78 | 200.8 | 72.50% | 46.2 | 47.80% |
| 4R6 | Original Images | 14.68 | 229.6 | 75.60% | 0 | - |

FIG. 4

|  | Model | ImageNet | | | | Places2 | |
|---|---|---|---|---|---|---|---|
|  |  | FID | IS | CA | PD | FID | PD |
| 6R1 | DeepFillv2 | 9.4 | 174.6 | 68.80% | 64.7 | 13.5 | 63 |
| 6R2 | HiFill | 12.4 | 157 | 65.70% | 86.2 | 15.7 | 92.8 |
| 6R3 | Co-ModGAN | - | - | - | - | 12.4 | 51.6 |
| 6R4 | Palette | 5.2 | 205.5 | 72.30% | 27.6 | 11.7 | 35 |
| 6R5 | DeepFillv2 | 18 | 135.3 | 64.30% | 117.2 | 15.3 | 96.3 |
| 6R6 | HiFill | 20.1 | 126.8 | 62.30% | 129.7 | 16.9 | 115.4 |
| 6R7 | Co-ModGAN | - | - | - | - | 13.7 | 86.2 |
| 6R8 | Palette | 6.6 | 173.9 | 69.30% | 59.5 | 11.9 | 57.3 |
| 6R9 | Original Images | 5.1 | 231.6 | 74.60% | 0 | 11.4 | 0 |

FIG. 6

|  | | ImageNet | | | Places2 | |
| --- | --- | --- | --- | --- | --- | --- |
| Model | FiD | IS | CA | PD | FiD | PD |
| 7R1 | Boundless | 18.7 | 104.1 | 58.80% | 127.9 | 11.8 | 129.3 |
| 7R2 | Palette | 5.8 | 138.1 | 63.40% | 85.9 | 3.53 | 103.3 |
| 7R3 | Original Images | 2.7 | 250.1 | 76.00% | 0 | 2.1 | 0 |

FIG. 7

| QF | Model | FID-5K | IS | CA | PD | |
|---|---|---|---|---|---|---|
| 5 | Regression | 29 | 73.9 | 52.80% | 155.4 | 9R1 |
| | Palette | 8.3 | 133.6 | 64.20% | 95.5 | 9R2 |
| 10 | Regression | 18 | 117.2 | 63.50% | 102.2 | 9R3 |
| | Palette | 5.4 | 180.5 | 70.70% | 58.3 | 9R4 |
| 20 | Regression | 11.5 | 158.7 | 69.70% | 65.4 | 9R5 |
| | Palette | 4.3 | 208.7 | 73.50% | 37.1 | 9R6 |
| | Original Images | 2.7 | 250.1 | 76.00% | 0 | 9R7 |

FIG. 9

| Model | # Params | FID | IS | PD | |
|---|---|---|---|---|---|
| *Fully Convolutional* | | | | | |
| Dilated Convolutions | 624M | 8 | 157.5 | 70.6 | 10R1 |
| More ResNet Blocks | 603M | 8.1 | 157.1 | 71.9 | 10R2 |
| *Self-Attention* | | | | | |
| Local Self-Attention | 552M | 9.4 | 149.8 | 78.2 | 10R3 |
| Global Self-Attention | 552M | 7.4 | 164.8 | 67.1 | 10R4 |

FIG. 10

| Model | Inpainting | | Colorization | | |
|---|---|---|---|---|---|
| | FID | PD | LPIPS | FID | PD | LPIPS |
| Diffusion (p=1) | 3.6 | 41.9 | 0.11 | 3.4 | 45.8 | 0.09 |
| Diffusion (p=2) | 3.6 | 43.8 | 0.13 | 3.4 | 48 | 0.15 |

FIG. 11

| Model | FID | IS | CA | PD |
|---|---|---|---|---|
| *Inpainting (128x128 center mask)* | | | | |
| Palette (Task-Specific) | 6.6 | 173.9 | 69.30% | 59.5 |
| Palette (Multi-task) | 6.8 | 165.7 | 68.90% | 65.2 |
| *Colorization* | | | | |
| Regression (Task-Specific) | 5.5 | 176.9 | 68.00% | 61.1 |
| Palette (Task-Specific) | 3.4 | 212.9 | 72.00% | 48 |
| Palette (Multi-task) | 3.7 | 187.4 | 69.40% | 57.1 |
| *JPEG Restoration (QF = 5)* | | | | |
| Regression (Task-Specific) | 29 | 73.9 | 52.80% | 155.4 |
| Palette (Task-Specific) | 8.3 | 133.6 | 64.20% | 95.5 |
| Palette (Multi-task) | 7 | 137.8 | 64.70% | 92.4 |

FIG. 13

1810 Receiving, by a computing device, training data comprising a plurality of pairs of images, wherein each pair comprises a noisy image and a denoised version of the noisy image

1820 Training, based on the training data, a multi-task diffusion model to perform a plurality of image-to-image translation tasks, wherein the training comprises:

iteratively generating a forward diffusion process by predicting, at each iteration in a sequence of iterations and based on a current noisy estimate of the denoised version of the noisy image, noise data for a next noisy estimate of the denoised version of the noisy image, updating, at each iteration, the current noisy estimate to the next noisy estimate by combining the current noisy estimate with the predicted noise data, and determining a reverse diffusion process by inverting the forward diffusion process to predict the denoised version of the noisy image

1830 Providing, by the computing device, the trained multi-task diffusion model.

FIG. 18

1910 Receiving, by a computing device, an input image

1920 Applying a multi-task diffusion model to predict a denoised version of the input image by applying a reverse diffusion process, the diffusion model having been trained on a plurality of pairs of images, wherein each pair comprises a noisy image and a denoised version of the noisy image, and the diffusion model having been trained to perform a plurality of image-to-image translation tasks, the training comprising:

iteratively generating a forward diffusion process by predicting, at each iteration in a sequence of iterations and based on a current noisy estimate of the denoised version of the noisy image, noise data for a next noisy estimate of the denoised version of the noisy image, updating, at each iteration, the current noisy estimate to the next noisy estimate by combining the current noisy estimate with the predicted noise data, and determining the reverse diffusion process by inverting the forward diffusion process to predict the denoised version of the input image

1930 Providing, by the computing device, the predicted denoised version of the input image

FIG. 19

IMAGE-TO-IMAGE MAPPING BY ITERATIVE DE-NOISING

CROSS REFERENCE TO RELATED APPLICATIONS

This application claims priority to U.S. Provisional Application Ser. No. 63/253,126 filed Oct. 6, 2021, the contents of which are incorporated by reference herein.

BACKGROUND

This specification relates to processing image data using machine learning models. Many types of image processing tasks may be formulated as image-to-image translation tasks. Examples of such tasks include super-resolution, colorization, instance segmentation, depth estimation, and inpainting.

SUMMARY

This specification generally describes an image processing system that can process a noisy image to generate a denoised version of the noisy image. The image processing system may be configured to perform any of a variety of possible tasks, e.g., colorization, inpainting, uncropping, removing decompression artifacts, super-resolution, de-noising, de-blurring, or a combination thereof.

In a first aspect, a computer-implemented method is provided. The method includes receiving, by a computing device, training data comprising a plurality of pairs of images, wherein each pair comprises a noisy image and a denoised version of the noisy image. The method also includes training, based on the training data, a multi-task diffusion model to perform a plurality of image-to-image translation tasks. This training includes iteratively generating a forward diffusion process by predicting, at each iteration in a sequence of iterations and based on a current noisy estimate of the denoised version of the noisy image, noise data for a next noisy estimate of the denoised version of the noisy image; updating, at each iteration, the current noisy estimate to the next noisy estimate by combining the current noisy estimate with the predicted noise data; and determining a reverse diffusion process by inverting the forward diffusion process to predict the denoised version of the noisy image. The method also includes providing, by the computing device, the trained multi-task diffusion model.

In a second aspect, a computing device is provided. The computing device includes one or more processors and data storage. The data storage has stored thereon computer-executable instructions that, when executed by one or more processors, cause the computing device to carry out functions. The functions include: receiving, by the computing device, training data comprising a plurality of pairs of images, wherein each pair comprises a noisy image and a denoised version of the noisy image; training, based on the training data, a multi-task diffusion model to perform a plurality of image-to-image translation tasks, wherein the training comprises: iteratively generating a forward diffusion process by predicting, at each iteration in a sequence of iterations and based on a current noisy estimate of the denoised version of the noisy image, noise data for a next noisy estimate of the denoised version of the noisy image, updating, at each iteration, the current noisy estimate to the next noisy estimate by combining the current noisy estimate with the predicted noise data, and determining a reverse diffusion process by inverting the forward diffusion process to predict the denoised version of the noisy image; and providing, by the computing device, the trained multi-task diffusion model.

In a third aspect, a computer program is provided. The computer program includes instructions that, when executed by a computing device, cause the computing device to carry out functions. The functions include: receiving, by the computing device, training data comprising a plurality of pairs of images, wherein each pair comprises a noisy image and a denoised version of the noisy image; training, based on the training data, a multi-task diffusion model to perform a plurality of image-to-image translation tasks, wherein the training comprises: iteratively generating a forward diffusion process by predicting, at each iteration in a sequence of iterations and based on a current noisy estimate of the denoised version of the noisy image, noise data for a next noisy estimate of the denoised version of the noisy image, updating, at each iteration, the current noisy estimate to the next noisy estimate by combining the current noisy estimate with the predicted noise data, and determining a reverse diffusion process by inverting the forward diffusion process to predict the denoised version of the noisy image; and providing, by the computing device, the trained multi-task diffusion model.

In a fourth aspect, an article of manufacture is provided. The article of manufacture includes one or more computer readable media having computer-readable instructions stored thereon that, when executed by one or more processors of a computing device, cause the computing device to carry out functions. The functions include: receiving, by the computing device, training data comprising a plurality of pairs of images, wherein each pair comprises a noisy image and a denoised version of the noisy image; training, based on the training data, a multi-task diffusion model to perform a plurality of image-to-image translation tasks, wherein the training comprises: iteratively generating a forward diffusion process by predicting, at each iteration in a sequence of iterations and based on a current noisy estimate of the denoised version of the noisy image, noise data for a next noisy estimate of the denoised version of the noisy image, updating, at each iteration, the current noisy estimate to the next noisy estimate by combining the current noisy estimate with the predicted noise data, and determining a reverse diffusion process by inverting the forward diffusion process to predict the denoised version of the noisy image; and providing, by the computing device, the trained multi-task diffusion model.

In a fifth aspect, a system is provided. The system includes means for receiving, by a computing device, training data comprising a plurality of pairs of images, wherein each pair comprises a noisy image and a denoised version of the noisy image; means for training, based on the training data, a multi-task diffusion model to perform a plurality of image-to-image translation tasks, wherein the training comprises: iteratively generating a forward diffusion process by predicting, at each iteration in a sequence of iterations and based on a current noisy estimate of the denoised version of the noisy image, noise data for a next noisy estimate of the denoised version of the noisy image, updating, at each iteration, the current noisy estimate to the next noisy estimate by combining the current noisy estimate with the predicted noise data, and determining a reverse diffusion process by inverting the forward diffusion process to predict the denoised version of the noisy image; and means for providing, by the computing device, the trained multi-task diffusion model.

In a sixth aspect, a computer-implemented method is provided. The method includes receiving, by a computing device, an input image. The method also includes applying a multi-task diffusion model to predict a denoised image by applying a reverse diffusion process, the diffusion model having been trained on a plurality of pairs of images, wherein each pair comprises a noisy image and a denoised version of the noisy image, and the diffusion model having been trained to perform a plurality of image-to-image translation tasks, the training comprising: iteratively generating a forward diffusion process by predicting, at each iteration in a sequence of iterations and based on a current noisy estimate of the denoised version of the noisy image, noise data for a next noisy estimate of the denoised version of the noisy image, updating, at each iteration, the current noisy estimate to the next noisy estimate by combining the current noisy estimate with the predicted noise data, and determining the reverse diffusion process by inverting the forward diffusion process to predict the denoised version of the input image. The method also includes providing, by the computing device, the predicted denoised version of the input image.

In a seventh aspect, a computing device is provided. The computing device includes one or more processors and data storage. The data storage has stored thereon computer-executable instructions that, when executed by one or more processors, cause the computing device to carry out functions. The functions include: receiving, by the computing device, an input image; applying a multi-task diffusion model to predict a denoised version of the input image by applying a reverse diffusion process, the diffusion model having been trained on a plurality of pairs of images, wherein each pair comprises a noisy image and a denoised version of the noisy image, and the diffusion model having been trained to perform a plurality of image-to-image translation tasks, the training comprising: iteratively generating a forward diffusion process by predicting, at each iteration in a sequence of iterations and based on a current noisy estimate of the denoised version of the noisy image, noise data for a next noisy estimate of the denoised version of the noisy image, updating, at each iteration, the current noisy estimate to the next noisy estimate by combining the current noisy estimate with the predicted noise data, and determining the reverse diffusion process by inverting the forward diffusion process to predict the denoised version of the input image; and providing, by the computing device, the predicted denoised version of the input image.

In an eighth aspect, a computer program is provided. The computer program includes instructions that, when executed by a computing device, cause the computing device to carry out functions. The functions include: receiving, by the computing device, an input image; applying a multi-task diffusion model to predict a denoised version of the input image by applying a reverse diffusion process, the diffusion model having been trained on a plurality of pairs of images, wherein each pair comprises a noisy image and a denoised version of the noisy image, and the diffusion model having been trained to perform a plurality of image-to-image translation tasks, the training comprising: iteratively generating a forward diffusion process by predicting, at each iteration in a sequence of iterations and based on a current noisy estimate of the denoised version of the noisy image, noise data for a next noisy estimate of the denoised version of the noisy image, updating, at each iteration, the current noisy estimate to the next noisy estimate by combining the current noisy estimate with the predicted noise data, and determining the reverse diffusion process by inverting the forward diffusion process to predict the denoised version of the input image; and providing, by the computing device, the predicted denoised version of the input image.

In a ninth aspect, an article of manufacture is provided. The article of manufacture includes one or more computer readable media having computer-readable instructions stored thereon that, when executed by one or more processors of a computing device, cause the computing device to carry out functions. The functions include: receiving, by the computing device, an input image; applying a multi-task diffusion model to predict a denoised version of the input image by applying a reverse diffusion process, the diffusion model having been trained on a plurality of pairs of images, wherein each pair comprises a noisy image and a denoised version of the noisy image, and the diffusion model having been trained to perform a plurality of image-to-image translation tasks, the training comprising: iteratively generating a forward diffusion process by predicting, at each iteration in a sequence of iterations and based on a current noisy estimate of the denoised version of the noisy image, noise data for a next noisy estimate of the denoised version of the noisy image, updating, at each iteration, the current noisy estimate to the next noisy estimate by combining the current noisy estimate with the predicted noise data, and determining the reverse diffusion process by inverting the forward diffusion process to predict the denoised version of the input image; and providing, by the computing device, the predicted denoised version of the input image.

In a tenth aspect, a system is provided. The system includes means for receiving, by a computing device, an input image; means for applying a multi-task diffusion model to predict a denoised version of the input image by applying a reverse diffusion process, the diffusion model having been trained on a plurality of pairs of images, wherein each pair comprises a noisy image and a denoised version of the noisy image, and the diffusion model having been trained to perform a plurality of image-to-image translation tasks, the training comprising: iteratively generating a forward diffusion process by predicting, at each iteration in a sequence of iterations and based on a current noisy estimate of the denoised version of the noisy image, noise data for a next noisy estimate of the denoised version of the noisy image, updating, at each iteration, the current noisy estimate to the next noisy estimate by combining the current noisy estimate with the predicted noise data, and determining the reverse diffusion process by inverting the forward diffusion process to predict the denoised version of the input image; and means for providing, by the computing device, the predicted denoised version of the input image.

In an eleventh aspect, a computer-implemented method is provided. The method includes receiving, by a computing device, a first input image comprising a first image degradation and a second input image comprising a second image degradation. The method also includes applying a multi-task diffusion model to predict respective denoised versions of the first input image and the second input image by applying a reverse diffusion process, wherein the predicting involves removing the first image degradation from the first input image and the second image degradation from the second input image, and the diffusion model having been trained to: iteratively generate a forward diffusion process, and determine the reverse diffusion process by inverting the forward diffusion process to predict the respective denoised versions of the first input image and the second input image. The method also includes providing, by the computing device, the respective denoised versions of the first input image and the second input image.

In a twelfth aspect, a computing device is provided. The computing device includes one or more processors and data storage. The data storage has stored thereon computer-executable instructions that, when executed by one or more processors, cause the computing device to carry out functions. The functions include: receiving, by the computing device, a first input image comprising a first image degradation and a second input image comprising a second image degradation; applying a multi-task diffusion model to predict respective denoised versions of the first input image and the second input image by applying a reverse diffusion process, wherein the predicting involves removing the first image degradation from the first input image and the second image degradation from the second input image, and the diffusion model having been trained to: iteratively generate a forward diffusion process, and determine the reverse diffusion process by inverting the forward diffusion process to predict the respective denoised versions of the first input image and the second input image; and providing, by the computing device, the respective denoised versions of the first input image and the second input image.

In a thirteenth aspect, a computer program is provided. The computer program includes instructions that, when executed by a computing device, cause the computing device to carry out functions. The functions include: receiving, by the computing device, a first input image comprising a first image degradation and a second input image comprising a second image degradation; applying a multi-task diffusion model to predict respective denoised versions of the first input image and the second input image by applying a reverse diffusion process, wherein the predicting involves removing the first image degradation from the first input image and the second image degradation from the second input image, and the diffusion model having been trained to: iteratively generate a forward diffusion process, and determine the reverse diffusion process by inverting the forward diffusion process to predict the respective denoised versions of the first input image and the second input image; and providing, by the computing device, the respective denoised versions of the first input image and the second input image.

In a fourteenth aspect, an article of manufacture is provided. The article of manufacture includes one or more computer readable media having computer-readable instructions stored thereon that, when executed by one or more processors of a computing device, cause the computing device to carry out functions. The functions include: receiving, by the computing device, a first input image comprising a first image degradation and a second input image comprising a second image degradation; applying a multi-task diffusion model to predict respective denoised versions of the first input image and the second input image by applying a reverse diffusion process, wherein the predicting involves removing the first image degradation from the first input image and the second image degradation from the second input image, and the diffusion model having been trained to: iteratively generate a forward diffusion process, and determine the reverse diffusion process by inverting the forward diffusion process to predict the respective denoised versions of the first input image and the second input image; and providing, by the computing device, the respective denoised versions of the first input image and the second input image.

In a fifteenth aspect, a system is provided. The system includes means for receiving, by a computing device, a first input image comprising a first image degradation and a second input image comprising a second image degradation; means for applying a multi-task diffusion model to predict respective denoised versions of the first input image and the second input image by applying a reverse diffusion process, wherein the predicting involves removing the first image degradation from the first input image and the second image degradation from the second input image, and the diffusion model having been trained to: iteratively generate a forward diffusion process, and determine the reverse diffusion process by inverting the forward diffusion process to predict the respective denoised versions of the first input image and the second input image; and means for providing, by the computing device, the respective denoised versions of the first input image and the second input image.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

The patent or application on file contains at least one drawing executed in color. Copies of this patent or patent application publication with color drawings will be provided by the Office upon request and payment of the necessary fee.

FIG. 4 is a table illustrating performance comparisons between various image processing models, in accordance with example embodiments.

FIG. 6 is a table illustrating performance comparisons between various image processing models, in accordance with example embodiments.

FIG. 7 is a table illustrating performance comparisons between various image processing models, in accordance with example embodiments.

FIG. 9 is a table illustrating performance comparisons between various image processing models, in accordance with example embodiments.

FIG. 10 is a table illustrating performance comparisons for different model configurations, in accordance with example embodiments.

FIG. 11 is a table illustrating a comparison of distance norms, in accordance with example embodiments.

FIG. 13 is a table illustrating performance comparisons between various image processing models, in accordance with example embodiments.

FIG. 18 is a flowchart of a method, in accordance with example embodiments.

FIG. 19 is another flowchart of a method, in accordance with example embodiments.

DETAILED DESCRIPTION

Figure 1:
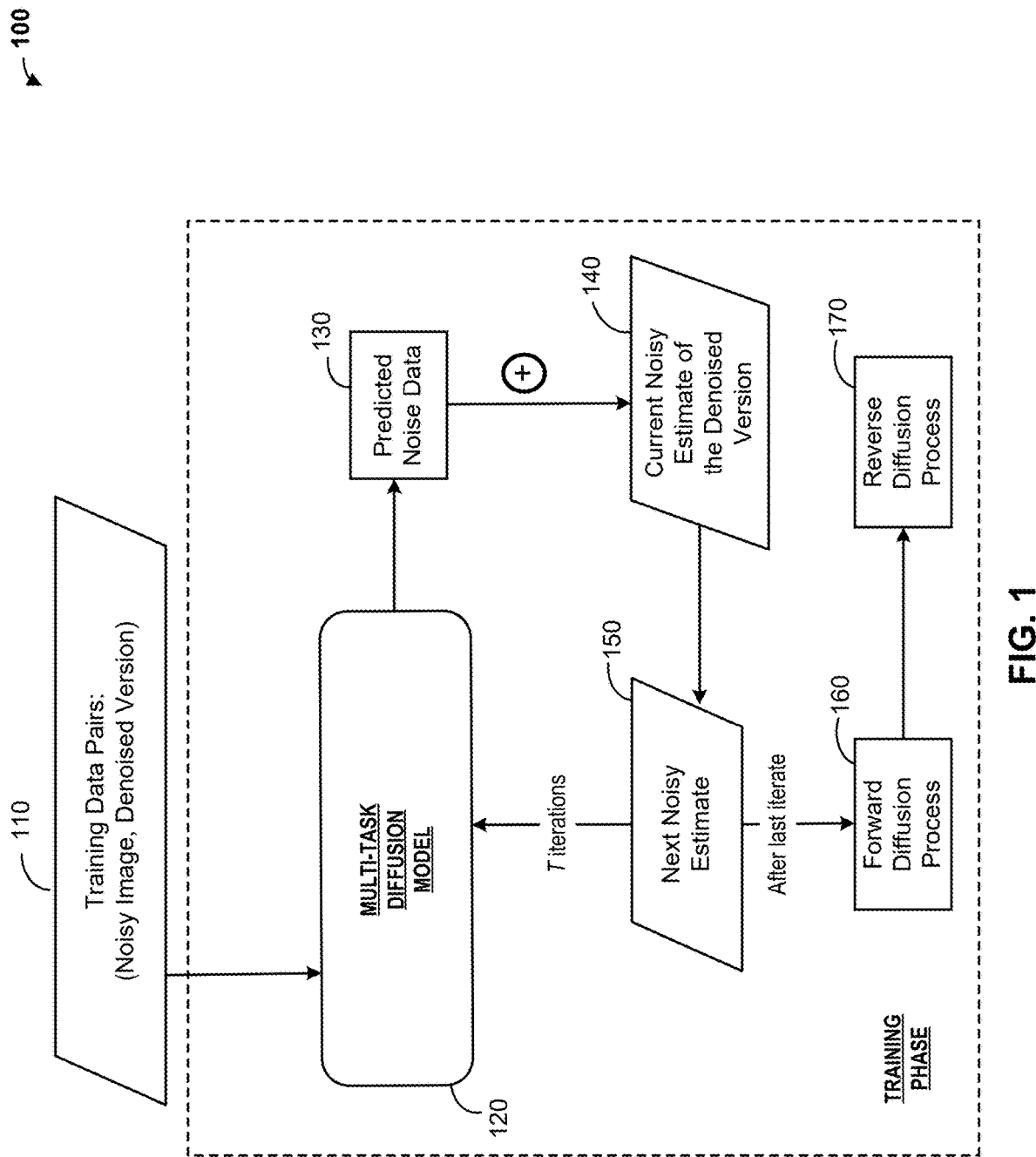
FIG. 1 illustrates training of a multi-task diffusion model to perform image-to-image translation, in accordance with example embodiments.

This application generally relates to image-to-image translation tasks, such as denoising an image. An image may have one or more image degradations such as deficient colorization, a gap in the image, a blur (e.g., motion blur, lens blur), a compression artifact, an image distortion, image cropping, and so forth. The image-to-image translation tasks may include a variety of possible tasks, including but not limited to, colorization, inpainting, uncropping, removing decompression artifacts, super-resolution, de-noising, de-blurring, or a combination thereof. As such, an image-processing-related technical problem arises that involves removing the one or more image degradations to generate a sharp image.

An iterative refinement process enables the image processing system described herein to generate higher quality outputs than existing systems, e.g., outputs that are more realistic and accurate than those generated by existing systems. In particular, the image processing system can achieve a desired performance level over fewer training iterations than would be required by some existing systems, thus enabling reduced consumption of computational resources (e.g., memory and computing power) during training.

The image processing system can perform multiple image-to-image translation tasks, without having to training a separate refinement neural network for each image-to-image translation task, without having to tune task-specific hyper-parameters, without architecture customization, and without any auxiliary loss. For example, the model described herein can perform operations including colorization, inpainting, and de-blurring (or any other appropriate set of multiple tasks). In some embodiments, the model may perform better on each individual task as a result of being trained to perform multiple tasks, e.g., by exploiting commonalities that exist between one or more of the multiple tasks. Training one model to perform multiple image-to-image translation tasks enables more efficient use of resources (e.g., computational resources, such as memory, computing power, and so forth), by not having to train and/or store a respective model to perform each image-to-image translation task.

In one example, (a copy of) the trained neural network can reside on a mobile computing device. The mobile computing device can include a camera that can capture an input image. A user of the mobile computing device can view the input image and determine that the input image should be sharpened. The user can then provide the input image to the trained neural network residing on the mobile computing device. In response, the trained neural network can generate a predicted output image that is a sharper version of the input image, and subsequently output the output image (e.g., provide the output image for display by the mobile computing device). In other examples, the trained neural network is not resident on the mobile computing device; rather, the mobile computing device provides the input image to a remotely-located trained neural network (e.g., via the Internet or another data network). The remotely-located convolutional neural network can process the input image and provide an output image that is a sharper version of the input image to the mobile computing device. In other examples, non-mobile computing devices can also use the trained neural network to sharpen images, including images that are not captured by a camera of the computing device.

In some examples, the trained neural network can work in conjunction with other neural networks (or other software) and/or be trained to recognize whether an input image has image degradations. Then, upon a determination that an input image has image degradations, the herein-described trained neural network could apply the trained neural network, thereby removing the image degradations in the input image.

As such, the herein-described techniques can improve images by removing image degradations, thereby enhancing their actual and/or perceived quality. Enhancing the actual and/or perceived quality of images, including portraits of people, can provide emotional benefits to those who believe their pictures look better. These techniques are flexible, and so can apply to images of human faces and other objects, scenes, and so forth.

Overview and Introduction

Many problems in vision and image processing are image-to-image translation problems. Examples include restoration tasks, like super-resolution, colorization, and inpainting, as well as pixel-level image understanding tasks, such as instance segmentation and depth estimation. Many of these tasks are complex inverse problems, where multiple output images may be consistent with a single input. An approach to image-to-image translation is to learn the conditional distribution of output images given the input, for example, by using deep generative models, that can capture multi-modal distributions in the high-dimensional space of images.

Some inpainting approaches work well on textured regions but may fail to generate semantically consistent structure. Generative Adversarial Networks (GANs) are used but require auxiliary objectives on structures, context, edges, contours, and hand-engineered features, and they lack diversity in their outputs. Image uncropping or "outpainting" is considered more challenging than inpainting as it entails generating open-ended content with less context. GAN-based methods are, generally, domain-specific.

Colorization can be a challenging task, requiring a degree of scene understanding, which makes it a natural choice for self-supervised learning. There are many challenges, including diverse colorization, respecting semantic categories, and producing high-fidelity color. Some approaches make use of specialized auxiliary classification losses, but this task-specific specialization means that the models may have difficulty generalizing to other tasks.

JPEG restoration or "JPEG artifact removal" is a nonlinear inverse problem involving removal off compression artifacts. Although deep CNN architectures and GANs have been applied to this problem, these methods have relied on relatively high quality factors, i.e., above 10.

Multi-task training is an under-explored area in image-to-image translation. Some existing methods focus primarily on similar enhancement tasks like deblurring, denoising, and super-resolution, and use smaller modular networks. GANs are generally used for image-to-image tasks because they are capable of generating high fidelity outputs and can support efficient sampling. GAN-based techniques have been proposed for image-to-image problems like unpaired translation, unsupervised cross-domain generation, multi-domain translation, and few shot translation. Nevertheless, existing GAN models are generally unsuccessful in translating images with consistent structural and textural regularity. Further, GANs may be challenging to train, and these models may drop modes in the output distribution. Autoregressive models, variational autoencoders (VAEs), and normalizing flows may also be applied for specific applications; however, such models may not be as generalizable as GANs. Other methods perform simultaneous training over multiple degradations on a single task, e.g., multi-scale super-resolution and JPEG restoration on multiple quality factors. The model described herein may sometimes be referred to as "Palette," as a reference to a diversity of outputs that may be generated, and/or tasks that may be performed. Palette is a multi-task image-to-image diffusion model for a wide variety of tasks.

Diffusion-based models also may be used for image generation, audio synthesis, image super-resolution, unpaired image-to-image translation, image editing, and so forth. Generally speaking, diffusion models convert samples from a standard Gaussian distribution into samples from an empirical data distribution through an iterative denoising process. Some diffusion models for inpainting and other linear inverse problems have adapted unconditional models for use in conditional tasks. However, unconditional tasks are often more challenging than conditional tasks, which make the denoising process conditional on an input signal. Palette is a conditional multi-task model, a single model for multiple tasks.

Image processing techniques described herein may include a 256×256 class-conditional U-Net architecture that is not based on class conditioning and has additional conditioning of the source image via concatenation.

The term "image degradation" as used herein, generally refers to any degradation in a sharpness of an image, such as, for example, a clarity of the image with respect to quantitative image quality parameters such as contrast, focus, and so forth. In some embodiments, the image degradation may include one or more of a motion blur, a lens blur, an image noise, an image compression artifact, a missing portion of an image, a cropped image, an image of a lower resolution, and so forth.

The term "motion blur" as used herein, generally refers to an image degradation where one or more objects in an image appear vague, and/or indistinct due to a motion of a camera capturing the image, a motion of the one or more objects, or a combination of the two. In some examples, a motion blur may be perceived as streaking or smearing in the image. The term "lens blur" as used herein, generally refers to an image degradation where an image appears to have a narrower depth of field than the scene being captured. For example, certain objects in an image may be in focus, whereas other objects may appear out of focus.

The term "image noise" as used herein, generally refers to an image degradation where an image appears to have artifacts (e.g., specks, color dots, and so forth) resulting from a lower signal-to-noise ratio (SNR). For example, an SNR below a certain desired threshold value may cause image noise. In some examples, image noise may occur due to an image sensor, or a circuitry in a camera. The term "image compression artifact" as used herein, generally refers to an image degradation that results from lossy image compression. For example, image data may be lost during compression, thereby resulting in visible artifacts in a decompressed version of the image.

Diffusion Models

FIG. 1 illustrates training 100 of a multi-task diffusion model 120 to perform image-to-image translation, in accordance with example embodiments. In some embodiments, training data 110 comprising a plurality of pairs of images may be received. Each pair includes a noisy image and a denoised version of the noisy image. The multi-task diffusion model 120 generates a forward diffusion process 160 by iteratively adding noise to the denoised version. After generating the forward diffusion process 160, the multi-task diffusion model 120 learns a reverse diffusion process 170 that can be applied to denoise an image. The multi-task diffusion model 120 is trained to perform a plurality of image-to-image translation tasks.

In some embodiments, the plurality of image-to-image translation tasks include one or more of a colorization task, an uncropping task, an inpainting task, a decompression artifact removal task, a super-resolution task, a de-noising task, or a panoramic image generation task. In some embodiments, multi-task diffusion model 120 is a neural network. For example, multi-task diffusion model 120 may be an encoder-decoder network including an encoder, a decoder, and one or more skip connections between various layers of the encoder and the decoder. In some embodiments, the encoder-decoder network may include one or more self-attention refinement neural network layers.

In some embodiments, at a first iteration, a current noisy estimate of the denoised version of the noisy image may be initialized to generate an initial estimate of the noisy image. Also, for example, noise data may be sampled from a predetermined noise distribution. The method involves iteratively generating the forward diffusion process 160 by predicting, at each iteration in a sequence of iterations (e.g., T iterations), and based on a current noisy estimate 140 of the denoised version of the noisy image, noise data 130 to predict a next noisy estimate 150 of the denoised version of the noisy image. For example, the method involves updating, at each iteration, the 140 to the next noisy estimate 150 by combining the current noisy estimate 140 with the predicted noise data 140.

In a subsequent iteration, the next noisy estimate 150 is re-initialized as current noisy estimate 140, and provided as input to the multi-task diffusion model 120, which then predicts updated noise data 130. Updated noise data 130 may be combined with the current noisy estimate 140 to generate another next noisy estimate 150. The iterative process may continue until a desired next noisy estimate 150 is achieved.

In some embodiments, the predicting of the noise data 140 may involve estimating actual noise in the noisy image based on the corresponding denoised version of the noisy image. Also, for example, the multi-task diffusion model 120 may be a neural network, and the training may involve updating one or more current values of a set of parameters of the neural network using one or more gradients of an objective function that measures an error between: (i) the predicted noise data, and (ii) the actual noise data in the noisy image. In some embodiments, the error may be one of an $L_1$ error or an $L_2$ error.

After the multi-task diffusion model 120 generates the forward diffusion process 160 based on the iterative process outlined above, the multi-task diffusion model 120 learns the reverse diffusion process 170 by inverting the forward diffusion process 160. Accordingly, a trained multi-task diffusion model 120 can be configured to predict the denoised version of the noisy image. Such operations are further described below.

Forward Diffusion Process

For example, given a noisy image x and a denoised image y, 110, a diffusion model may generate a noisy version of the denoised image ỹ, and train a multi-task diffusion model 120, to denoise ỹ given input image x and a noise level indicator γ. In some embodiments, x may be iteratively downsampled through an encoder. In some embodiments, the downsampling could be, for example, from a resolution of 128×128 to a resolution of 64×64 and then to a resolution of 8×8. In some embodiments, an output from the downsampling process may be iteratively upsampled, for example, from a resolution of 8×8 to a resolution of 64×64 and then to a resolution of 128×128, through a decoder. In some embodiments, skip connections may be used to connect portions of the encoder-decoder blocks.

Image-to-image diffusion models may be conditional diffusion models of the form p(y|x), where both x and y are images, such as a grayscale image 110, represented as x, and a color image, represented as y. In some embodiments, the forward diffusion process is a Markovian process that iteratively adds Gaussian noise to the denoised image, such as an initial data point $y_0 \equiv y$ over T iterations:

$$q(y_{t+1}|y_t) = N(y_{t-1}; \sqrt{a_t} y_{t-1}, (1-a_t)I)$$

$$q(y_{1:T} | y_0) = \prod_{t=1}^{T} q(y_t | y_{t-1}) \quad \text{(Eqn. 1)}$$

The $a_t$ are hyper-parameters of the noise schedule. The forward process with $a_t$ is constructed in a manner where at iterate t=T, $y_T$ is virtually indistinguishable from Gaussian noise. Also, for example, it may be possible to marginalize the forward diffusion process 160, at each step as shown below:

$$q(y_t|y_0) = N(y_t; \sqrt{\gamma_t} y_0, (1-\gamma_t)I), \quad \text{(Eqn. 2)}$$

where $\gamma_t = \Pi_t \, a_t'$.

The Gaussian parameterization of the forward diffusion process 160, enables a closed form formulation of the posterior distribution of $y_{t-1}$ given $(y_0, y_t)$ as:

$$q(y_{t-1}|y_0, y_t) = N(y_{t-1}|\mu, \sigma^2 I) \quad \text{(Eqn. 3)}$$

where $$\mu = \frac{\sqrt{\gamma_{t-1}}(1-\alpha_t)}{1-\gamma_t} y_0 + \frac{\sqrt{\alpha_t}(1-\gamma_{t-1})}{1-\gamma_t} y_t \text{ and}$$

$$\sigma^2 = \frac{(1-\gamma_{t-1})(1-\alpha_t)}{1-\gamma_t}.$$

Such a formulation is useful during inference.

Reverse Diffusion Process

Palette learns a reverse diffusion process 170, that inverts the forward diffusion process 160. For example, given an estimate of the denoised version of the noisy image ỹ, $$\tilde{y} = \sqrt{\gamma} y_0 + \sqrt{1-\gamma} \epsilon, \epsilon \sim \mathcal{N}(0,I), \quad \text{(Eqn. 4)}$$

the goal is to recover the denoised version of the noisy image y. It is possible to parameterize the neural network model $f_\theta(x, \tilde{y}, \gamma)$ to condition on x, ỹ, and the current noise level γ. Determining the reverse diffusion process 170 entails prediction of the noise vector ε by optimizing the objective $$\mathbb{E}_{(x,y)} \mathbb{E}_{\epsilon, \gamma} \|f_\theta(x, \sqrt{\gamma} y_0 + \sqrt{1-\gamma}\epsilon, \gamma) - \epsilon\|_p^p. \quad \text{(Eqn. 5)}$$

This objective is equivalent to maximizing a weighted variational lower-bound on the likelihood. Though any positive integer value may be used for the value of p, the standard formulation is based on the usual $L_2$ norm, i.e., p=2. Experimental results suggest that a value of p=1 can capture the output distribution more faithfully and may reduce potential hallucinations in some applications.

Inference

Palette performs inference via the learned reverse process 170. Since the forward diffusion process 160, is constructed so the prior distribution $p(y_T)$ approximates a standard normal distribution $N(y_T|0, I)$, the sampling process can start at pure Gaussian noise, followed by T steps of iterative refinement. The model $f_\theta$ is trained to estimate ε, given a noisy image ỹ and $y_t$. Thus, given $y_t$, it is possible to approximate $y_0$ as $$\hat{y}_0 = \frac{1}{\sqrt{\gamma_t}} (y_t - \sqrt{1-\gamma_t} f_\theta(x, y_t, \gamma_t)). \quad \text{(Eqn. 6)}$$

Substituting $\hat{y}_0$ into the posterior distribution of $q(y_{t-1}|y_0, y_t)$ to parameterize the mean of $p_\theta(y_{t-1}|y_t, x)$ yields:

$$\mu_\theta(x, y_t, \gamma_t) = \frac{1}{\sqrt{\alpha_t}} \left( y_t - \frac{1-\alpha_t}{\sqrt{1-\gamma_t}} f_\theta(x, y_t, \gamma_t) \right). \quad \text{(Eqn. 7)}$$

The variance of $p_\theta(y_{t-1}|y_t, x)$ is $(1-\alpha_t)$, which may be a default given by the variance of the forward diffusion process. Additional and/or alternative values for the variation are possible. With such a parameterization, each iteration of the reverse process may be computed as $$y_{t-1} \leftarrow \frac{1}{\sqrt{\alpha_t}} \left( y_t - \frac{1-\alpha_t}{\sqrt{1-\gamma_t}} f_\theta(x, y_t, \gamma_t) \right) + \sqrt{1-\alpha_t} \epsilon_t, \quad \text{(Eqn. 8)}$$

where $\epsilon_t \sim N(0, I)$, the standard normal distribution. This process may be iterated repeatedly to produce the final predicted denoised image, $\hat{y}_0$. In some embodiments, such a representative process may resemble one step of Langevin dynamics for which $f_\theta$ provides an estimate of the gradient of the data log-density.

Implementation

In some embodiments, training data comprising a plurality of pairs of images, wherein each pair comprises an image and at least one corresponding target version of the image, may be received. For example, each image may be associated with a plurality of target versions. For example, there may be several different higher resolution versions of a input image of a lower resolution. Also, for example, there may be several different colored versions of an input black and white image. A neural network may be trained based on the training data to predict a denoised version of an input image. The training of the neural network may include applying a forward Gaussian diffusion process that adds Gaussian noise to a corresponding target version of each of the plurality of pairs of images to enable iterative denoising of the input image, wherein the iterative denoising is based on a reverse Markov chain associated with the forward Gaussian diffusion process. An example algorithm for training a denoising model $f_\theta$ may be given as:

Step 1. repeat

Step 2. (x, $y_0$)~p(x, y)

Step 3. γ~p(γ)
Step 4. ε~ $\mathcal{N}$(0, I)
Step 5. Take a gradient descent step on $\nabla_\theta \| f_\theta(x, \sqrt{\gamma} y_0 + \sqrt{1-\gamma}\epsilon, \gamma) - \epsilon \|_p^p$
Step 6. until converged.

An example algorithm for inference in T iterative refinement steps may be given as:
Step 1. $y_T$ ~ $\mathcal{N}$(0, I)
Step 2. for t=T, . . . , 1 do
Step 3. z~ $\mathcal{N}$(0, I) if t>1, else z=0
Step 4.

$$y_{t-1} = \frac{1}{\sqrt{\alpha_t}}\left(y_t - \frac{1-\alpha_t}{\sqrt{1-\gamma_t}} f_\theta(x, y_t, y_t)\right) + \sqrt{1-\alpha_t} z$$

Step 5. end for
Step 6. return $y_0$

Example Implementation Details

There are many possible parameter values to implement the Palette methods. For example, models may be trained with a mini batch-size of 1024 for 1M training steps. If overfitting is not found to be an issue, the model checkpoint at 1M steps may be used for reporting results. For example, a standard Adam optimizer with a fixed 1e-4 learning rate and 10,000 linear learning rate warmup schedule may be used. For example, a 0.9999 EMA may be used. Though task-specific hyper-parameter tuning, or architectural modifications, are not required for each task, such procedures may be performed.

Though not required, it is possible to perform a conditioning for training Palette. This allows the performance of hyper-parameter tuning over noise schedules and refinement steps for Palette during inference. For example, a linear noise schedule of (1e$^{-6}$, 0.01) with 2,000 time-steps and 1,000 refinement steps with a linear schedule of (1e$^{-4}$, 0.09) during inference are possible.

It is possible to have specific model designs to train, test, or compare model performance across methods.

For example, RGB parameterization may be used for colorization. For example, the grayscale image may be used as the source image and Palette may be trained to predict the full RGB image. For example, during training, the largest square crop from the image may be randomly selected and resized it to 256×256.

For example, for inpainting tasks, Palette may be trained on a combination of free-form and rectangular masks. Multiple types and combinations of masked may be selected. For example, for rectangular masks, between 1 and 5 masks may be randomly sampled. The total area covered by the rectangular masks may be maintained between 10% to 40% of the image. Free-form masks may be randomly sampled with 60% probability and rectangular masks with 40% probability. Additional mask channels may be provided or it is possible to fill the masked region with Gaussian noise. For example, during training, the loss function may be restricted to the spatial region corresponding to masked regions, and the prediction of the model may be used for only the masked region during inference. For example, Palette may be trained on two types of 256×256 crops. These crops may be random 256×256 crops and may be combined with the resized random largest square crops. Self-attention layers have been an important component in recent U-Net architectures for diffusion models. While self-attention layers provide a direct form of global dependency, they may not be amenable to generalization to unseen image resolutions, which may not be convenient for many image-to-image tasks. Such self-attention layers may be incorporated in example embodiments, such as for the task of inpainting. A variety of configurations is possible by replacing global self-attention layers with different alternatives depending on a balance between large context dependency and resolution robustness. Four example architectures are described below. These examples are illustrative examples of the varieties of possible architectures.

For example, a "Global Self-Attention" architecture may be used. The global self-attention architecture may correspond to a baseline configuration with global self-attention layers at 32×32, 16×16, and 8×8 resolutions. As another example, a "Local Self-Attention" architecture may be used. The local self-attention architecture may correspond to local self-attention layers at 32×32, 16×16, and 8×8 resolutions, where, in some embodiments, feature maps may be divided into four non-overlapping query blocks. Also, for example, a "More ResNet Blocks," architecture may be used where 2× residual blocks at 32×32, 16×16, and 8×8 resolutions facilitate deeper convolutions that increase receptive field sizes. As another example, a "Dilated Convolutions" architecture may be used where ResNet blocks at 32×32, 16×16, and 8×8 resolutions with increasing dilation rates facilitate exponentially increasing receptive fields. These sample architectures may be compared with each other. For example, the models may be trained for 500,000 steps, with a batch size of 512.

For example, for uncropping tasks, the model for image extension may be trained along one dimension, or along more than one dimension. In either case, the masked region may be the same, such as 50%, or different. For example, during training masking may be uniformly selected along one side or different sides. For example, the rest of the training details may be identical to inpainting.

For example, for JPEG restoration tasks, training may be performed on different quality factors, with lower quality factors indicating a higher compression level and lower image quality. For example, an exponential distribution may be used to sample the quality factor during training. For example, the sampling probability of a quality range Q may be set to $\propto e^{Q/10}$.

Evaluations

Figure 2:
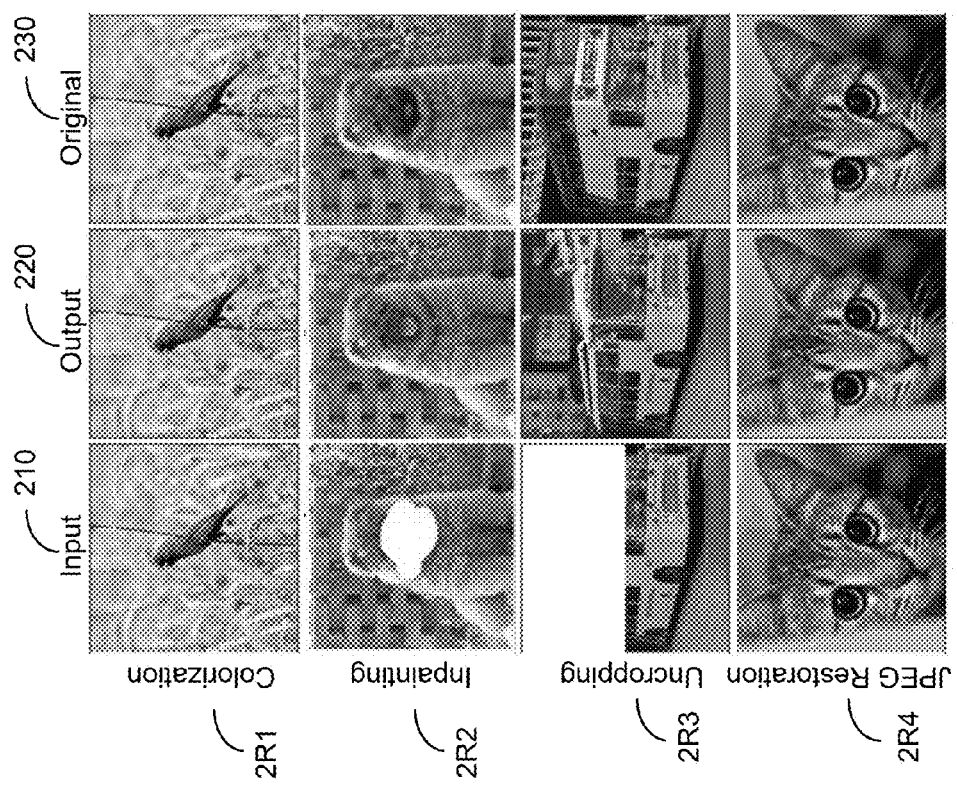
FIG. 2 illustrates example output images for different tasks, in accordance with example embodiments.

FIG. 2 illustrates example output images for different tasks, in accordance with example embodiments. For example, FIG. 2 highlights example images, 200, of example tasks to which Palette may be applied. These tasks may include: colorization, illustrated in row 2R1, inpainting, illustrated in row 2R2, uncropping, illustrated in row 2R3, and JPEG restoration, illustrated in row 2R4. For a noisy image or input image, 210, Palette produces the output image, 220, shown, the estimate of the original image, 230. Each row 2R1-2R4 shows corresponding input image 210, output image 220, and original image 230.

Figure 3:
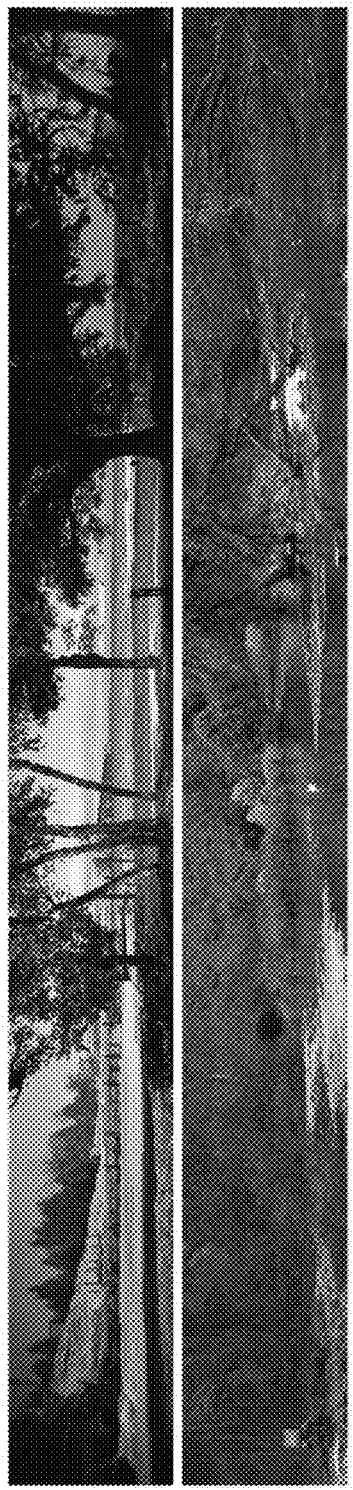
FIG. 3 illustrates example output images, in accordance with example embodiments.

FIG. 3 illustrates example output images, in accordance with example embodiments. As illustrated, central 256×256 pixel regions are iteratively extrapolated to generate a final image of 256×3202 pixels, two examples of which are depicted in image 300. The performance of Palette in each of the tasks may be compared with the performance of established methods, including, but not limited to, Pix2Pix (image-to-image translation with a conditional GAN), PixColor (pixel recursive colorization), ColTran colorizer, Regression, DeepFillv2 (free-form image inpainting with gated convolution), HiFill (contextual residual aggregation for ultra high-resolution image inpainting), co-modulated GAN (Co-ModGAN), and Boundless (GAN-based image extension). In these example comparisons, there is no task-specific hyper-parameter tuning, architecture customization, or any auxiliary loss function. However, such task-specific features may be included within the Palette framework. In the example comparisons, inputs and outputs for all tasks are represented as 256×256 RGB images. However, other sizes and color spaces, such as YCbCr, are possible.

Colorization Studies

FIG. 4 is a table illustrating performance comparisons between various image processing models, in accordance with example embodiments. The task is colorization, in which the goal is to transform a grayscale image into a plausible color image. Colorization entails a representation of objects, segmentation, and layout, with long-range image dependencies. Performance comparisons between Palette and the other models are performed using ImageNet for both training and validation. The first five thousand (5,000) images from the ImageNet validation set are used to report performance on standard metrics Fréchet Inception Distance (FID), Inception Score (IS), Classification Accuracy (CA) (top-1 of a pre-trained ResNet-50 classifier), and Perceptual Distance (PD) (Euclidean distance in Inception-v1 feature space). The next five thousand (5,000) images are used as the reference distribution for FID. Two-alternative forced choice (2AFC) trials are used to evaluate the perceptual quality of model outputs against natural images. The results may be summarized as the "fool rate," the percentage of human raters who select model outputs over natural images when they were asked "Which image would you guess is from a camera?" The fool rate is the fraction of human raters who select the model outputs over the reference image.

Table 400 has seven rows and six columns. The first column, 405, displays a model used. The second column, 410, displays the FID scores associated with the model in the first column 405. For FID, a lower number indicates better performance. The third column, 420, displays the IS scores associated with the models in the first column, 405. For IS, a higher number indicates a better performance. The fourth column, 430, displays the CA scores associated with the first column, 405. For CA, a higher score indicates better performance. The fifth column, 440, displays the PD scores associated with the models in the first column, 405. For PD scores, a lower value indicates better performance. The sixth column, 450, displays the fool rates associated with the models in the first column, 405. For the fool rate, a higher value indicates better performance. Scores for established methods are shown in rows 4R1 through 4R4. Scores for Palette are shown in row 4R5. Scores for the original images are shown in row 4R6. All metrics indicate that Palette performs better that all comparable methods and close the performance of the original images.

Figure 5:
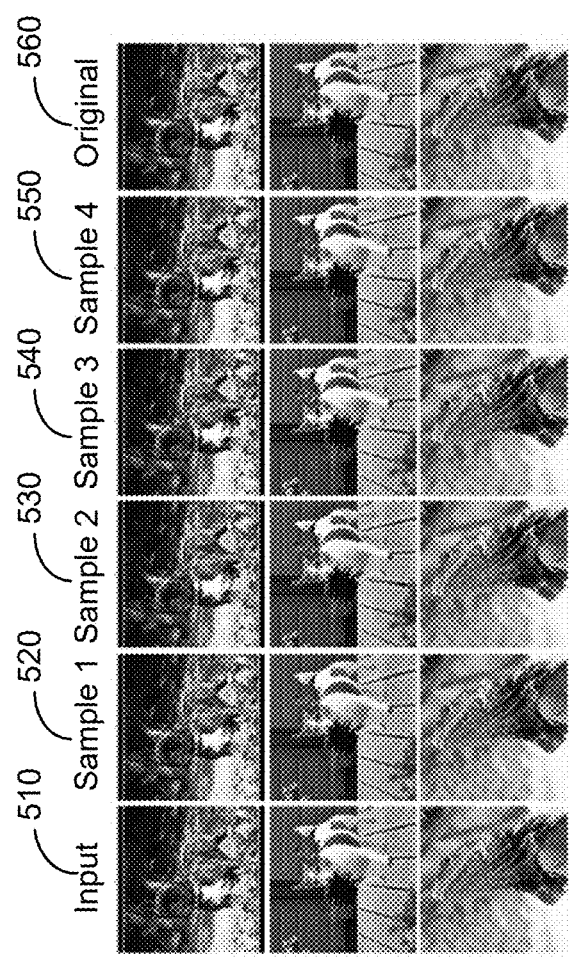
FIG. 5 illustrates a diversity of colorization outputs, in accordance with example embodiments.

FIG. 5 illustrates a diversity of colorization outputs 500, in accordance with example embodiments. Palette colorizes the original grayscale images, 510. Multiple plausible potential colorizations, 520, 530, 540, and 550 are possible for a given grayscale image when no color information from the original color image, 560, is given.

Inpainting Studies

FIG. 6 is a table 600 illustrating performance comparisons between various image processing models, in accordance with example embodiments. The task is inpainting, which requires user-specified masked regions of an image to be filled with realistic content. Table 600 has nine rows and seven columns. The first column, 605, displays the model used. The next set of four columns, 610, show the performance of each model shown in the first column, 605, on a subset of the ImageNet validation set, composed of the first 5,000 images in the ImageNet validation set. The next set of two columns, 620, show the performance of each model shown in the first column, 605, on a categorically-balanced 10,950 image subset of Places2 validation set. The second column, 630, displays the FID scores for each model in the first column, 605, on the ImageNet dataset. The third column, 640, displays the IS scores for each model in the first column, 605, on the ImageNet dataset. The fourth column, 650, displays the CA scores for each model in the first column, 605, on the ImageNet dataset. The fifth column, 660, displays the PD scores for each model in the first column, 605, on the ImageNet dataset. The sixth column, 670, displays the FID scores for each model in the first column, 605, on the Places2 dataset. The seventh column, 680, displays the PD scores for each model in the first column, 605, on the Places2 dataset.

The first row, 6R1, shows the scores for the DeepFillv2 method for the ImageNet and Places2 datasets when 20%-30% of the image is removed with free-form masks. The second row, 6R2, shows the scores for the HiFill method for the ImageNet and Places2 datasets when 20%-30% of the image is removed with free-form masks. The third row, 6R3, shows the scores for the Co-ModGAN method for the ImageNet and Places2 datasets when 20%-30% of the image is removed with free-form masks. The fourth row, 6R4, shows the scores for the Palette method for the ImageNet and Places2 datasets when 20%-30% of the image is removed with free-form masks.

The fifth row, 6R5, shows the scores for the DeepFillv2 method for the ImageNet and Places2 datasets when the mask is a central region of 128×128 pixels. The sixth row, 6R6, shows the scores for the HiFill method for the ImageNet and Places2 datasets when the mask is a central region of 128×128 pixels. The seventh row, 6R7, shows the scores for the Co-ModGAN method for the ImageNet and Places2 datasets when the mask is a central region of 128×128 pixels. The eighth row, 6R8, shows the scores for the Palette method for the ImageNet and Places2 datasets when the mask is a central region of 128×128 pixels. The ninth row, 6R9, shows the scores for the original images for the ImageNet and Places2 datasets. The results indicate that Palette performs better than Deepfillv2, HiFill, and Co-ModGAN for both types of masks. Further, the performance of Palette is close to the performance of the original images.

Uncropping Studies

FIG. 7 is a table 700 illustrating performance comparisons between various image processing models, in accordance with example embodiments. The task is uncropping, which may be more challenging than inpainting as there is less surrounding context to constrain semantically meaningful generation. Table 700 has three rows and seven columns. The first column, 705, displays the model used. The next set of four columns, 710, displays the performance of each model shown in the first column, 705, on the ImageNet validation set. The next set of two columns, 720, displays the performance of each model shown in the first column, 705, on the Places2 validation set. The second column, 730, displays the FID scores for each model in the first column, 705, on the ImageNet dataset. The third column, 740, displays the IS scores for each model in the first column, 705, on the ImageNet dataset. The fourth column, 750, displays the CA scores for each model in the first column, 705, on the ImageNet dataset. The fifth column, 760, displays the PD scores for each model in the first column, 705, on the ImageNet dataset. The sixth column, 770, displays the FID scores for each model in the first column, 705, on the Places2 dataset. The seventh column, 780, displays the PD scores for each model in the first column, 705, on the Places2 dataset.

The first row, 7R1, shows the scores for the Boundless method for the ImageNet and Places2 datasets. The second row, 7R2, shows the scores for the Palette method for the ImageNet and Places2 datasets. The third row, 7R3, shows the scores for the original images for the ImageNet and Places2 datasets. The results indicate that Palette has superior performance compared with Boundless, with scores that are closer to those of the original images.

Figure 8:
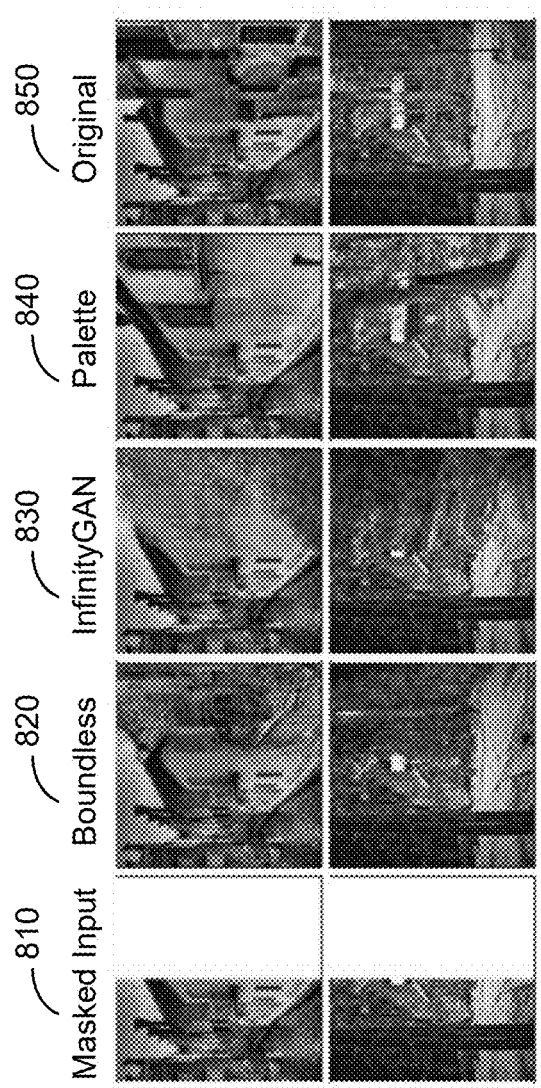
FIG. 8 illustrates visual comparisons between various image processing models, in accordance with example embodiments.

FIG. 8 illustrates visual comparisons 800 between various image processing models, in accordance with example embodiments. The masked inputs, 810, are images when half of the content is removed. The methods, Boundless, 820, InfinityGAN, 830, and Palette, 840, are all applied to the same input image. Palette produces images that appear more realistic than Boundless or InfinityGAN and are comparable to the original images, 850.

JPEG Restoration Studies

FIG. 9 is a table 900 illustrating performance comparisons between various image processing models, in accordance with example embodiments. The task is JPEG restoration. JPEG restoration is a non-linear inverse problem and is based on an appropriate local model of natural image statistics to detect and correct compression artifacts. Training and evaluation is performed on the ImageNet dataset. Table 900 has seven rows and six columns. The first column, 910, displays the quality factor for the images. The second column, 915, displays the model used. The third column, 920, contains the FID scores for each model in the second column, 915, on the ImageNet dataset. The fourth column, 930, displays the IS scores for each model in the second column, 915, on the ImageNet dataset. The fifth column, 940, displays the CA scores for each model in the second column, 915, on the ImageNet dataset. The sixth column, 950, displays the PD scores for each model in the second column, 915, on the ImageNet dataset.

The first row, 9R1, displays the scores for regression for the ImageNet dataset when the quality factor is 5. Lower quality factors indicate more compression and, thus, lower image quality. The second row, 9R2, displays the scores for Palette for the ImageNet dataset when the quality factor is 5. The third row, 9R3, displays the scores for regression for the ImageNet dataset when the quality factor is 10. The fourth row, 9R4, displays the scores for Palette for the ImageNet dataset when the quality factor is 10. The fifth row, 9R5, displays the scores for regression for the ImageNet dataset when the quality factor is 20. The sixth row, 9R6, displays the scores for Palette for the ImageNet dataset when the quality factor is 20. The seventh row, 9R7, displays the scores for the original images. Palette performs better than regression across all quality factor values. The performance gap between Palette and regression increases with decreasing quality factor.

Model Design Studies

FIG. 10 is a table 1000 illustrating performance comparisons for different model configurations, in accordance with example embodiments. The task is inpainting. Table 1000 has four rows and five columns. The first column, 1005, displays the model. The second column, 1010, displays the number of parameters in each model in the first column, 1005. The third column, 1020, displays the FID scores for each model in the first column, 1005. The fourth column, 1030, displays the IS scores for each model in the first column, 1005. The fifth column, 1040, displays the PD scores for each model in the first column, 1005.

The first row, 10R1, displays the scores for the fully convolutional method "Dilated Convolutions." The second row, 10R2, displays the scores from the fully convolutional method "More ResNet Blocks." The third row, 10R3, displays the scores from the self-attention method "Local Self-Attention." The fourth row, 10R4, displays the scores from the self-attention method "Global Self-Attention." Global Self-Attention offers improved performance over the two fully convolutional methods "Dilated Convolutions" and "More ResNet Blocks," demonstrating the importance of self-attention layers for tasks, such as inpainting. However, such gains are dependent on the architecture because Local Self-Attention performs worse than the fully convolutional methods.

FIG. 11 is a table 1100 illustrating a comparison of distance norms, in accordance with example embodiments. Table 1100 has two rows and seven columns. The first column, 1105, displays the model. Next set of three columns, 1110, displays the scores for each model in the first column, 1105, for an inpainting task. The next set of three columns, 1120, displays the scores for each model in the first column, 1105, for a colorization task. The second column, 1130, displays the FID scores for the inpainting task for each model in the first column, 1105. The third column, 1140, displays the PD scores for the inpainting task for each model in the first column, 1105. The fourth column, 1150, displays the Learned Perceptual Image Patch Similarity (LPIPS) scores for the inpainting task for each model in the first column, 1105. For LPIPS, higher scores indicate higher sample diversity. The fifth column, 1160, displays the FID scores for the colorization task for each model in the first column, 1105. The sixth column, 1170, displays the PD scores for the colorization task for each model in the first column, 1105. The seventh column, 1180, displays the LPIPS scores for the colorization task for each model in the first column, 1105.

The first row, 11R1, displays the scores when Palette optimizes an $L_1$ loss, i.e., when p=1. The second row, 11R2, displays the scores when Palette optimizes an $L_2$ loss, i.e., when p=2. Both models have comparable FID scores, indicating that both have comparable perceptual quality. However, the $L_1$ loss has somewhat lower PD scores, while the $L_2$ loss produces higher LPIPS scores, indicating increased sample diversity. A possible explanation for the lower PD scores is that $L_1$ models may drop more modes than $L_2$ models, thereby increasing the likelihood that a single sample from an $L_1$ model is from the mode containing the corresponding denoised version of the noisy image.

Multitask Studies

Figure 12:
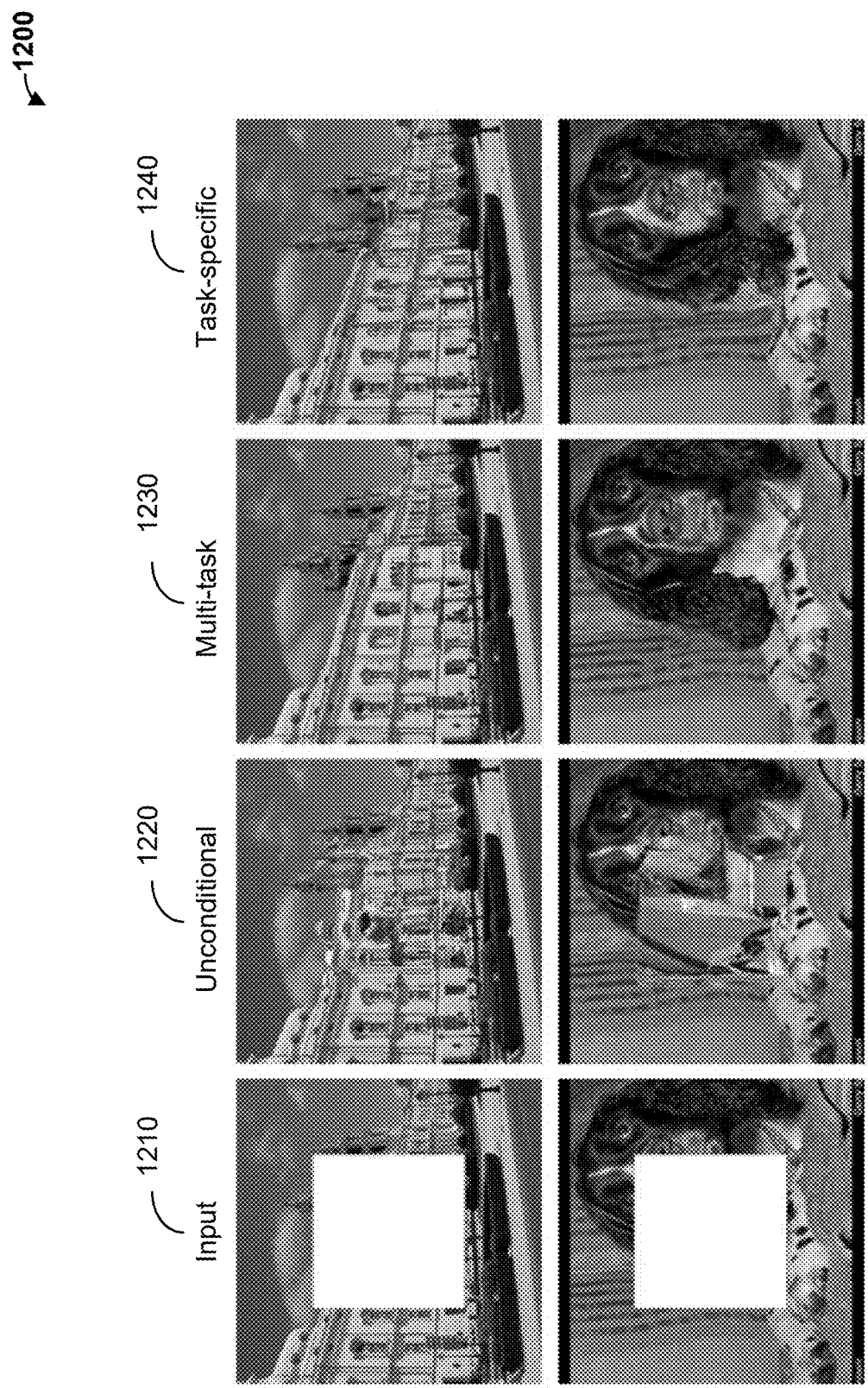
FIG. 12 illustrates a comparison between conditional and unconditional diffusion models, in accordance with example embodiments.

FIG. 12 illustrates a comparison 1200 between conditional and unconditional diffusion models, in accordance with example embodiments. Developing models that generalize across image-to-image tasks is difficult because of the specialized details associated with each task. The first column, 1210, displays the input noisy images. A goal of image processing is to learn a single model for multiple image-to-image tasks, i.e., blind image enhancement. This can be approximated by adapting an unconditional model to conditional tasks with imputation. The second column, 1220, displays the output of such a method, which comprises the adaptation of an unconditional method to a conditional task with imputation. In this method, in each iterative step, the image is denoised, pixels in the estimated image are replaced with pixels from the observed image region, and then noise is added. The third column, 1230, displays the output of a multi-task Palette method, i.e., one that is trained on all four tasks. The fourth column, 1240, displays the results of a Palette model trained solely on an inpainting task. The unconditional method performs poorly, with multiple visual artifacts. This may be because it is hard to learn a strong unconditional model on diverse datasets, and also because, during iterative refinement of the unconditional model, noise is added to all pixels, including the observed pixels. By contrast, Palette is condition directly on noiseless observations for all steps.

The two Palette methods perform similarly, with few, if any visual artifacts.

FIG. 13 is a table 1300 illustrating performance comparisons between various image processing models, in accordance with example embodiments. Table 1300 contains eight rows and five columns. The first column, 1305, displays the model. The second column, 1310, displays the FIP scores for each model in the first column, 1305. The third column, 1320, displays the IS scores for each model in the first column, 1305. The fourth column, 1330, displays the CA scores for each model in the first column, 1305. The fifth column, 1340, displays the PD scores for each model in the first column, 1305. There are comparisons for three tasks. The first task, 1350, is inpainting with a 128×128 center mask. The second task, 1360, is colorization. The third task, 1370, is JPEG restoration with a quality factor of five.

The first row, 13R1, displays the results of the task-specific, i.e., trained on inpainting, Palette model for the inpainting task, 1350. The second row, 13R2, displays the results of the multi-task, i.e., trained on multiple tasks, Palette model for the inpainting task, 1350. The third row, 13R3, displays the results of regression on the colorization task, 1360. The forth row, 13R4, displays the results of the task-specific, i.e., trained on colorization, Palette model for the colorization task, 1360. The fifth row, 13R5, displays the results of the multi-task, i.e., trained on multiple tasks, Palette model for the colorization task, 1360. The sixth row, 13R6, displays the results of regression on the JPEG restoration task, 1370. The seventh row, 13R7, displays the results of the task-specific, i.e., trained on JPEG restoration, Palette model for the JPEG restoration task, 1370. The eighth row, 13R8, displays the results of the multi-task, i.e., trained on multiple tasks, Palette model for the JPEG restoration task, 1370. Regression models for colorization, 1360, and JPEG restoration, 1370, have the worst performance of the methods. For the inpainting task, 1350, task-specific Palette, 13R1, performs slightly better than the multi-task Palette, 13R2. For colorization, 1360, task-specific Palette, 13R4, performs slightly better than the multi-task Palette, 13R5. For JPEG restoration, 1370, task-specific Palette, 13R7, performs worse than the multi-task Palette, 13R8.

Training Machine Learning Models for Generating Inferences/Predictions

Figure 14:
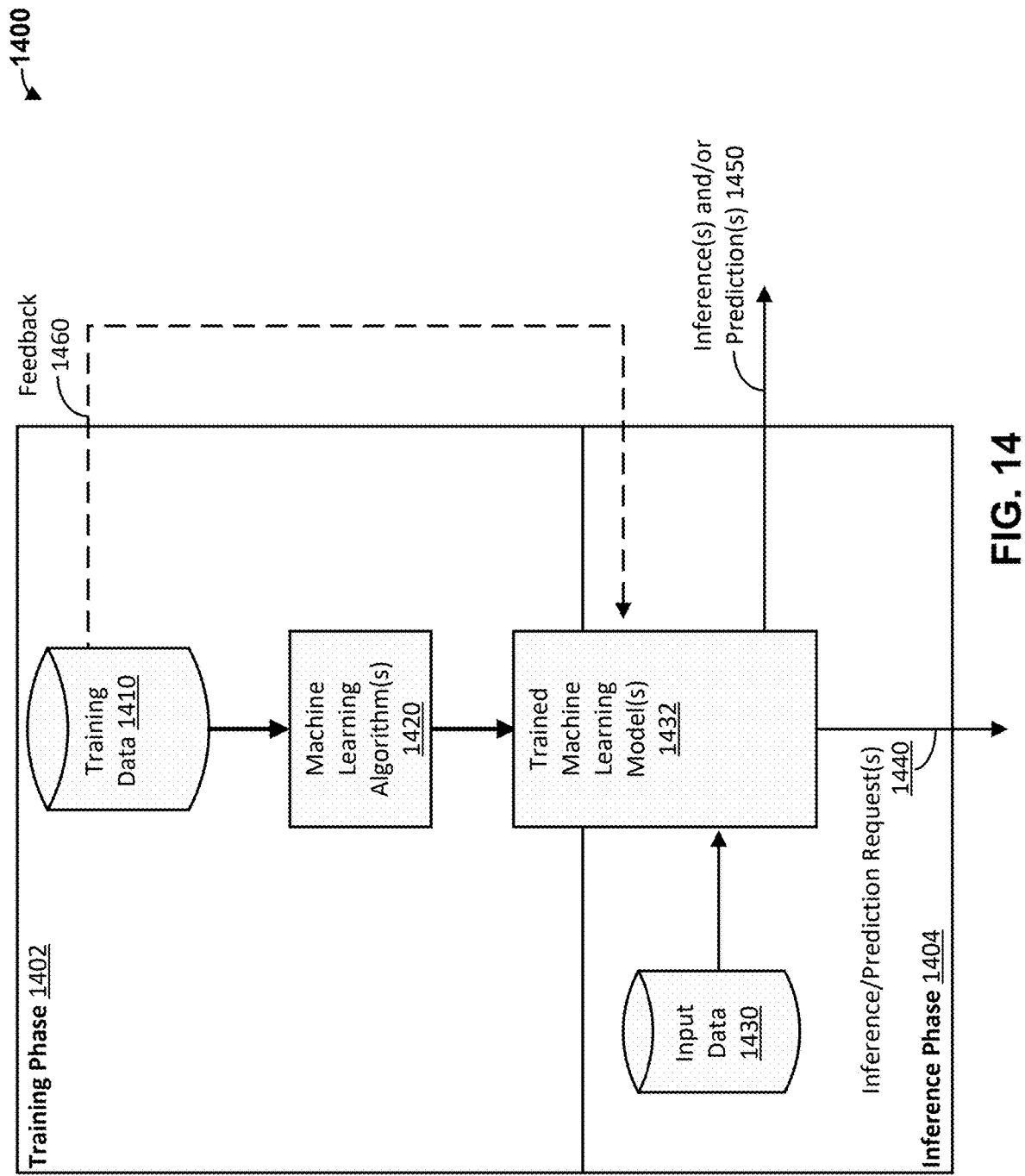
FIG. 14 is a diagram illustrating training and inference phases of a machine learning model, in accordance with example embodiments.

FIG. 14 is a diagram 1400 illustrating training and inference phases of a machine learning model, in accordance with example embodiments, in accordance with example embodiments. Some machine learning techniques involve training one or more machine learning algorithms on an input set of training data to recognize patterns in the training data and provide output inferences and/or predictions about (patterns in the) training data. The resulting trained machine learning algorithm may be termed as a trained machine learning model. For example, FIG. 14 shows training phase 1402 where one or more machine learning algorithms 1420 are being trained on training data 1410 to become trained machine learning model(s) 1432. Then, during inference phase 1404, trained machine learning model(s) 1432 can receive input data 1430 and one or more inference/prediction requests 1440 (perhaps as part of input data 1430) and responsively provide as an output one or more inferences and/or prediction(s) 1450.

As such, trained machine learning model(s) 1432 can include one or more models of one or more machine learning algorithms 1420. Machine learning algorithm(s) 1420 may include, but are not limited to: an artificial neural network (e.g., herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 1420 may be supervised or unsupervised, and may implement any suitable combination of online and offline learning.

In some examples, machine learning algorithm(s) 1420 and/or trained machine learning model(s) 1432 may be accelerated using on-device coprocessors, such as graphic processing units (GPUs), tensor processing units (TPUs), digital signal processors (DSPs), and/or application specific integrated circuits (ASICs). Such on-device coprocessors may be used to speed up machine learning algorithm(s) 1420 and/or trained machine learning model(s) 1432. In some examples, trained machine learning model(s) 1432 may be trained, can reside, and can execute to provide inferences on a particular computing device, and/or otherwise can make inferences for the particular computing device.

During training phase 1402, machine learning algorithm(s) 1420 may be trained by providing at least training data 1410 as training input using unsupervised, supervised, semi-supervised, and/or reinforcement learning techniques. Unsupervised learning involves providing a portion (or all) of training data 1410 to machine learning algorithm(s) 1420 and machine learning algorithm(s) 1420 determining one or more output inferences based on the provided portion (or all) of training data 1410. Supervised learning involves providing a portion of training data 1410 to machine learning algorithm(s) 1420, with machine learning algorithm(s) 1420 determining one or more output inferences based on the provided portion of training data 1410, and the output inference(s) are either accepted or corrected based on correct results associated with training data 1410. In some examples, supervised learning of machine learning algorithm(s) 1420 may be governed by a set of rules and/or a set of labels for the training input, and the set of rules and/or set of labels may be used to correct inferences of machine learning algorithm(s) 1420.

Semi-supervised learning involves having correct results for part, but not all, of training data 1410. During semi-supervised learning, supervised learning is used for a portion of training data 1410 having correct results, and unsupervised learning is used for a portion of training data 1410 not having correct results. Reinforcement learning involves machine learning algorithm(s) 1420 receiving a reward signal regarding a prior inference, where the reward signal may be a numerical value. During reinforcement learning, machine learning algorithm(s) 1420 can output an inference and receive a reward signal in response, where machine learning algorithm(s) 1420 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 1420 and/or trained machine learning model(s) 1432 may be trained using other machine learning techniques, including but not limited to, incremental learning and curriculum learning.

In some examples, machine learning algorithm(s) 1420 and/or trained machine learning model(s) 1432 can use transfer learning techniques. For example, transfer learning techniques can involve trained machine learning model(s) 1432 being pre-trained on one set of data and additionally trained using training data 1410. More particularly, machine learning algorithm(s) 1420 may be pre-trained on data from one or more computing devices and a resulting trained machine learning model provided to a particular computing device, where the particular computing device is intended to execute the trained machine learning model during inference phase 1404. Then, during training phase 1402, the pre-trained machine learning model may be additionally trained using training data 1410, where training data 1410 may be derived from kernel and non-kernel data of the particular computing device. This further training of the machine learning algorithm(s) 1420 and/or the pre-trained machine learning model using training data 1410 of the particular computing device's data may be performed using either supervised or unsupervised learning. Once machine learning algorithm(s) 1420 and/or the pre-trained machine learning model has been trained on at least training data 1410, training phase 1402 may be completed. The trained resulting machine learning model may be utilized as at least one of trained machine learning model(s) 1432.

In particular, once training phase 1402 has been completed, trained machine learning model(s) 1432 may be provided to a computing device, if not already on the computing device. Inference phase 1404 may begin after trained machine learning model(s) 1432 are provided to the particular computing device.

During inference phase 1404, trained machine learning model(s) 1432 can receive input data 1430 and generate and output one or more corresponding inferences and/or predictions 1450 about input data 1430. As such, input data 1430 may be used as an input to trained machine learning model(s) 1432 for providing corresponding inference(s) and/or prediction(s) 1450 to kernel components and non-kernel components. For example, trained machine learning model(s) 1432 can generate inference(s) and/or prediction(s) 1450 in response to one or more inference/prediction requests 1440. In some examples, trained machine learning model(s) 1432 may be executed by a portion of other software. For example, trained machine learning model(s) 1432 may be executed by an inference or prediction daemon to be readily available to provide inferences and/or predictions upon request. Input data 1430 can include data from the particular computing device executing trained machine learning model(s) 1432 and/or input data from one or more computing devices other than the particular computing device.

Inference(s) and/or prediction(s) 1450 can include output images, output intermediate images, numerical values, and/or other output data produced by trained machine learning model(s) 1432 operating on input data 1430 (and training data 1410). In some examples, trained machine learning model(s) 1432 can use output inference(s) and/or prediction(s) 1450 as input feedback 1460. Trained machine learning model(s) 1432 can also rely on past inferences as inputs for generating new inferences. After training, the trained version of the neural network may be an example of trained machine learning model(s) 1432. In this approach, an example of the one or more inference/prediction request(s) 1440 may be a request to denoise an input image and a corresponding example of inferences and/or prediction(s) 1450 may be a predicted denoised version of the input image.

In some examples, one computing device can include the trained version of the neural network, perhaps after training. Then, another computing device can receive a request to denoise input image (e.g., increase resolution), and use the trained version of the neural network to predict a denoised version of the input image.

In some examples, two or more computing devices may be used to provide output images; e.g., a first computing device can generate and send requests to denoise an input image to a second computing device. Then, the second computing device can use the trained version of the neural network, to denoise the input image, and respond to the requests from the first computing device for the denoised output image. Then, upon reception of responses to the requests, the first computing device can provide the requested denoised image (e.g., using a user interface and/or a display, a printed copy, an electronic communication, etc.).

Example Data Network

Figure 15:
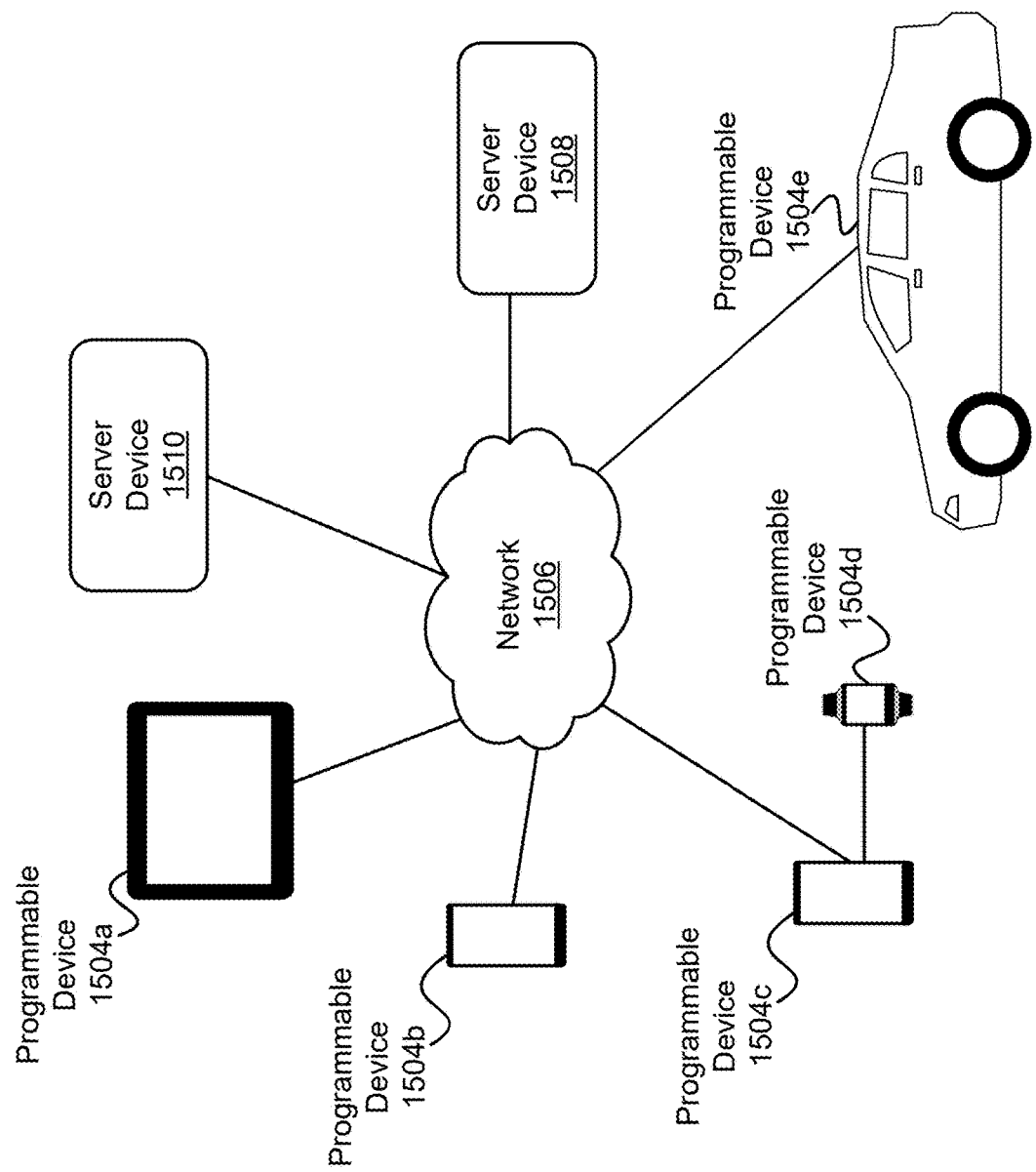
FIG. 15 depicts a distributed computing architecture, in accordance with example embodiments.

FIG. 15 depicts a distributed computing architecture 1500, in accordance with example embodiments. Distributed computing architecture 1500 includes server devices 1508, 1510 that are configured to communicate, via network 1506, with programmable devices 1504a, 1504b, 1504c, 1504d, 1504e. Network 1506 may correspond to a local area network (LAN), a wide area network (WAN), a WLAN, a WWAN, a corporate intranet, the public Internet, or any other type of network configured to provide a communications path between networked computing devices. Network 1506 may also correspond to a combination of one or more LANs, WANs, corporate intranets, and/or the public Internet.

Although FIG. 15 only shows five programmable devices, distributed application architectures may serve tens, hundreds, or thousands of programmable devices. Moreover, programmable devices 1504a, 1504b, 1504c, 1504d, 1504e (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 1504a, 1504b, 1504c, 1504e, programmable devices may be directly connected to network 1506. In other examples, such as illustrated by programmable device 1504d, programmable devices may be indirectly connected to network 1506 via an associated computing device, such as programmable device 1504c. In this example, programmable device 1504c can act as an associated computing device to pass electronic communications between programmable device 1504d and network 1506. In other examples, such as illustrated by programmable device 1504e, a computing device may be part of and/or inside a vehicle, such as a car, a truck, a bus, a boat or ship, an airplane, etc. In other examples not shown in FIG. 15, a programmable device may be both directly and indirectly connected to network 1506.

Server devices 1508, 1510 may be configured to perform one or more services, as requested by programmable devices 1504a-1504e. For example, server device 1508 and/or 1510 can provide content to programmable devices 1504a-1504e. The content can include, but is not limited to, webpages, hypertext, scripts, binary data such as compiled software, images, audio, and/or video. The content can include compressed and/or uncompressed content. The content may be encrypted and/or unencrypted. Other types of content are possible as well.

As another example, server device 1508 and/or 1510 can provide programmable devices 1504a-1504e with access to software for database, search, computation, graphical, audio, video, World Wide Web/Internet utilization, and/or other functions. Many other examples of server devices are possible as well.

Computing Device Architecture

Figure 16:
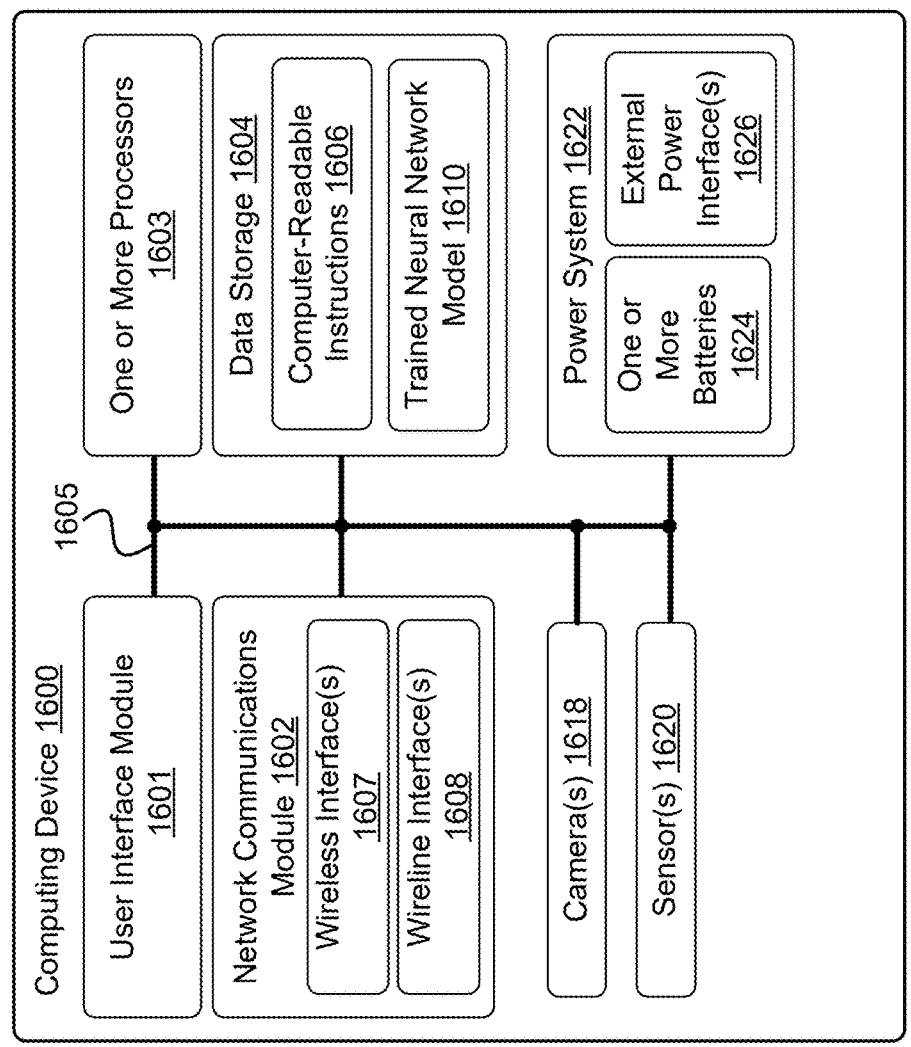
FIG. 16 is a block diagram of a computing device, in accordance with example embodiments.

FIG. 16 is a block diagram of a computing device 1600, in accordance with example embodiments. In particular, computing device 1600 shown in FIG. 16 may be configured to perform at least one function of and/or related to model 100 and/or method 1800.

Computing device 1600 may include a user interface module 1601, a network communications module 1602, one or more processors 1603, data storage 1604, one or more camera(s) 1618, one or more sensors 1620, and power system 1622, all of which may be linked together via a system bus, network, or other connection mechanism 1605.

User interface module 1601 may be operable to send data to and/or receive data from external user input/output devices. For example, user interface module 1601 may be configured to send and/or receive data to and/or from user input devices such as a touch screen, a computer mouse, a keyboard, a keypad, a touch pad, a trackball, a joystick, a voice recognition module, and/or other similar devices. User interface module 1601 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 1601 can also be configured to generate audible outputs, with devices such as a speaker, speaker jack, audio output port, audio output device, earphones, and/or other similar devices. User interface module 1601 can further be configured with one or more haptic devices that can generate haptic outputs, such as vibrations and/or other outputs detectable by touch and/or physical contact with computing device 1600. In some examples, user interface module 1601 may be used to provide a graphical user interface (GUI) for utilizing computing device 1600, such as, for example, a graphical user interface of a mobile phone device.

Network communications module 1602 can include one or more devices that provide one or more wireless interface(s) 1607 and/or one or more wireline interface(s) 1608 that are configurable to communicate via a network. Wireless interface(s) 1607 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 1608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 1602 may be configured to provide reliable, secured, and/or authenticated communications. For each communication described herein, information for facilitating reliable communications (e.g., guaranteed message delivery) may be provided, perhaps as part of a message header and/or footer (e.g., packet/message sequencing information, encapsulation headers and/or footers, size/time information, and transmission verification information such as cyclic redundancy check (CRC) and/or parity check values). Communications may be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms may be used as well or in addition to those listed herein to secure (and then decrypt/decode) communications.

One or more processors 1603 can include one or more general purpose processors, and/or one or more special purpose processors (e.g., digital signal processors, tensor processing units (TPUs), graphics processing units (GPUs), application specific integrated circuits, etc.). One or more processors 1603 may be configured to execute computer-readable instructions 1606 that are contained in data storage 1604 and/or other instructions as described herein.

Data storage 1604 can include one or more non-transitory computer-readable storage media that may be read and/or accessed by at least one of one or more processors 1603. The one or more computer-readable storage media can include volatile and/or non-volatile storage components, such as optical, magnetic, organic or other memory or disc storage, which may be integrated in whole or in part with at least one of one or more processors 1603. In some examples, data storage 1604 may be implemented using a single physical device (e.g., one optical, magnetic, organic or other memory or disc storage unit), while in other examples, data storage 1604 may be implemented using two or more physical devices.

Data storage 1604 can include computer-readable instructions 1606 and perhaps additional data. In some examples, data storage 1604 can include storage required to perform at least part of the herein-described methods, scenarios, and techniques and/or at least part of the functionality of the herein-described devices and networks. In some examples, data storage 1604 can include storage for a trained neural network model 1610 (e.g., a model of trained neural networks such as a U-net architecture based neural network). In particular of these examples, computer-readable instructions 1606 can include instructions that, when executed by one or more processors 1603, enable computing device 1600 to provide for some or all of the functionality of trained neural network model 1610.

In some examples, computing device 1600 can include one or more camera(s) 1618. Camera(s) 1618 can include one or more image capture devices, such as still and/or video cameras, equipped to capture light and record the captured light in one or more images; that is, camera(s) 1618 can generate image(s) of captured light. The one or more images may be one or more still images and/or one or more images utilized in video imagery. Camera(s) 1618 can capture light and/or electromagnetic radiation emitted as visible light, infrared radiation, ultraviolet light, and/or as one or more other frequencies of light.

In some examples, computing device 1600 can include one or more sensors 1620. Sensors 1620 may be configured to measure conditions within computing device 1600 and/or conditions in an environment of computing device 1600 and provide data about these conditions. For example, sensors 1620 can include one or more of: (i) sensors for obtaining data about computing device 1600, such as, but not limited to, a thermometer for measuring a temperature of computing device 1600, a battery sensor for measuring power of one or more batteries of power system 1622, and/or other sensors measuring conditions of computing device 1600; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors may be configured to read identifiers, such as RFID tags, barcodes, QR codes, and/or other devices and/or object configured to be read and provide at least identifying information; (iii) sensors to measure locations and/or movements of computing device 1600, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 1600, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 1600, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 1620 are possible as well.

Power system 1622 can include one or more batteries 1624 and/or one or more external power interfaces 1626 for providing electrical power to computing device 1600. Each battery of the one or more batteries 1624 can, when electrically coupled to the computing device 1600, act as a source of stored electrical power for computing device 1600. One or more batteries 1624 of power system 1622 may be configured to be portable. Some or all of one or more batteries 1624 may be readily removable from computing device 1600. In other examples, some or all of one or more batteries 1624 may be internal to computing device 1600, and so may not be readily removable from computing device 1600. Some or all of one or more batteries 1624 may be rechargeable. For example, a rechargeable battery may be recharged via a wired connection between the battery and another power supply, such as by one or more power supplies that are external to computing device 1600 and connected to computing device 1600 via the one or more external power interfaces. In other examples, some or all of one or more batteries 1624 may be non-rechargeable batteries.

One or more external power interfaces 1626 of power system 1622 can include one or more wired-power interfaces, such as a USB cable and/or a power cord, that enable wired electrical power connections to one or more power supplies that are external to computing device 1600. One or more external power interfaces 1626 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 1626, computing device 1600 can draw electrical power from the external power source the established electrical power connection. In some examples, power system 1622 can include related sensors, such as battery sensors associated with the one or more batteries or other types of electrical power sensors.

Cloud-Based Servers

Figure 17:
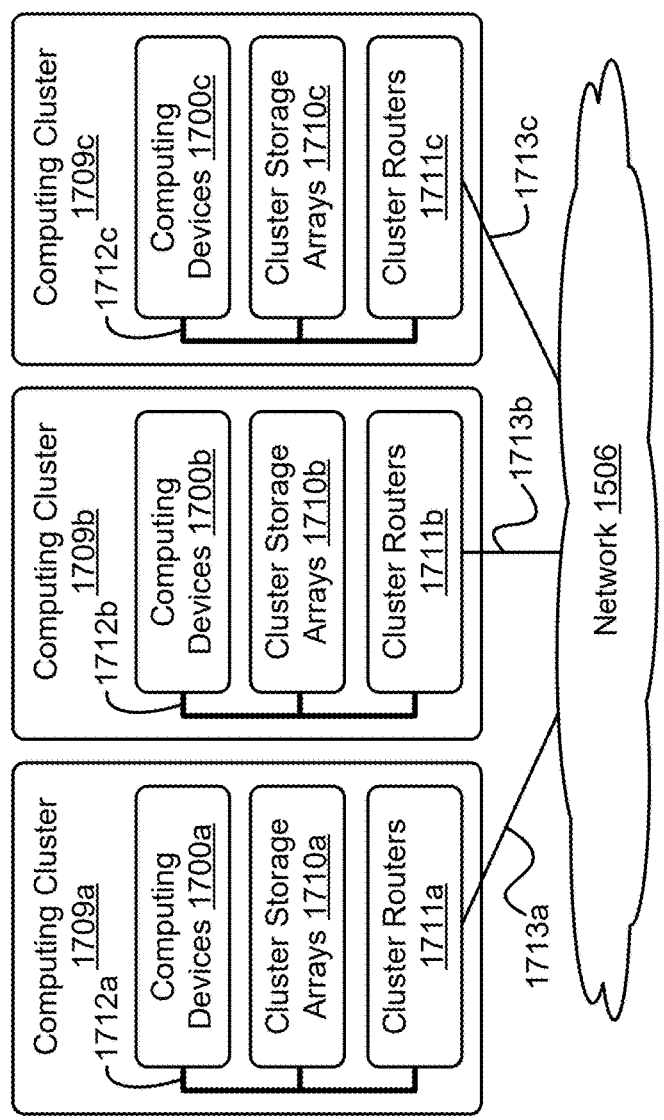
FIG. 17 depicts a network of computing clusters arranged as a cloud-based server system, in accordance with example embodiments.

FIG. 17 depicts a network of computing clusters arranged as a cloud-based server system 1700, in accordance with example embodiments. In FIG. 17, functionality of a neural network, and/or a computing device may be distributed among computing clusters 1709a, 1709b, 1709c. Computing cluster 1709a can include one or more computing devices 1700a, cluster storage arrays 1710a, and cluster routers 1711a connected by a local cluster network 1712a. Similarly, computing cluster 1709b can include one or more computing devices 1700b, cluster storage arrays 1710b, and cluster routers 1711b connected by a local cluster network 1712b. Likewise, computing cluster 1709c can include one or more computing devices 1700c, cluster storage arrays 1710c, and cluster routers 1711c connected by a local cluster network 1712c.

In some embodiments, computing clusters 1709a, 1709b, 1709c may be a single computing device residing in a single computing center. In other embodiments, computing clusters 1709a, 1709b, 1709c can include multiple computing devices in a single computing center, or even multiple computing devices located in multiple computing centers located in diverse geographic locations. For example, FIG. 17 depicts each of computing clusters 1709a, 1709b, 1709c residing in different physical locations.

In some embodiments, data and services at computing clusters 1709a, 1709b, 1709c may be encoded as computer readable information stored in non-transitory, tangible computer readable media (or computer readable storage media) and accessible by other computing devices. In some embodiments, computing clusters 1709a, 1709b, 1709c may be stored on a single disk drive or other tangible storage media, or may be implemented on multiple disk drives or other tangible storage media located at one or more diverse geographic locations.

In some embodiments, each of computing clusters 1709a, 1709b, and 1709c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1709a, for example, computing devices 1700a may be configured to perform various computing tasks of a conditioned, axial self-attention based neural network, and/or a computing device. In one embodiment, the various functionalities of a neural network, and/or a computing device may be distributed among one or more of computing devices 1700a, 1700b, 1700c. Computing devices 1700b and 1700c in respective computing clusters 1709b and 1709c may be configured similarly to computing devices 1700a in computing cluster 1709a. On the other hand, in some embodiments, computing devices 1700a, 1700b, and 1700c may be configured to perform different functions.

In some embodiments, computing tasks and stored data associated with a neural network, and/or a computing device may be distributed across computing devices 1700a, 1700b, and 1700c based at least in part on the processing requirements of a neural network, and/or a computing device, the processing capabilities of computing devices 1700a, 1700b, 1700c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 1710a, 1710b, 1710c of computing clusters 1709a, 1709b, 1709c may be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a conditioned, axial self-attention based neural network, and/or a computing device may be distributed across computing devices 1700a, 1700b, 1700c of computing clusters 1709a, 1709b, 1709c, various active portions and/or backup portions of these components may be distributed across cluster storage arrays 1710a, 1710b, 1710c. For example, some cluster storage arrays may be configured to store one portion of the data of a first layer of a neural network, and/or a computing device, while other cluster storage arrays can store other portion(s) of data of second layer of a neural network, and/or a computing device. Also, for example, some cluster storage arrays may be configured to store the data of an encoder of a neural network, while other cluster storage arrays can store the data of a decoder of a neural network. Additionally, some cluster storage arrays may be configured to store backup versions of data stored in other cluster storage arrays.

Cluster routers 1711a, 1711b, 1711c in computing clusters 1709a, 1709b, 1709c can include networking equipment configured to provide internal and external communications for the computing clusters. For example, cluster routers 1711a in computing cluster 1709a can include one or more internet switching and routing devices configured to provide (i) local area network communications between computing devices 1700a and cluster storage arrays 1710a via local cluster network 1712a, and (ii) wide area network communications between computing cluster 1709a and computing clusters 1709b and 1709c via wide area network link 1713a to network 1506. Cluster routers 1711b and 1711c can include network equipment similar to cluster routers 1711a, and cluster routers 1711b and 1711c can perform similar networking functions for computing clusters 1709b and 1709b that cluster routers 1711a perform for computing cluster 1709a.

In some embodiments, the configuration of cluster routers 1711a, 1711b, 1711c may be based at least in part on the data communication requirements of the computing devices and cluster storage arrays, the data communications capabilities of the network equipment in cluster routers 1711a, 1711b, 1711c, the latency and throughput of local cluster networks 1712a, 1712b, 1712c, the latency, throughput, and cost of wide area network links 1713a, 1713b, 1713c, and/or other factors that can contribute to the cost, speed, fault-tolerance, resiliency, efficiency and/or other design criteria of the moderation system architecture.

Example Method of Operation

FIG. 18 is a flowchart of a method 1800, in accordance with example embodiments. Method 1800 may be executed by a computing device, such as computing device 1600. Method 1800 may begin at block 1810, where the method involves receiving, by a computing device, training data comprising a plurality of pairs of images, wherein each pair comprises a noisy image and a denoised version of the noisy image.

At block 1820, the method involves training, based on the training data, a multi-task diffusion model to perform a plurality of image-to-image translation tasks, wherein the training comprises: iteratively generating a forward diffusion process by predicting, at each iteration in a sequence of iterations and based on a current noisy estimate of the denoised version of the noisy image, noise data for a next noisy estimate of the denoised version of the noisy image, updating, at each iteration, the current noisy estimate to the next noisy estimate by combining the current noisy estimate with the predicted noise data, and determining a reverse diffusion process by inverting the forward diffusion process to predict the denoised version of the noisy image.

At block 1830, the method involves providing, by the computing device, the trained multi-task diffusion model.

Some embodiments involve sampling, at a first iteration of the sequence of iterations, an initial noise data from a predefined noise distribution. In some embodiments, the predefined noise distribution is a standard Normal distribution.

In some embodiments, each iteration in the sequence of iterations is associated with a respective noise level parameter, and the predicting of the noise data at each iteration is based on the noise level parameter associated with the iteration.

In some embodiments, for each iteration in the sequence of iterations, the updating of the current noisy estimate to the next noisy estimate is performed by combining the predicted noise data with the current estimate in accordance with the noise level parameter associated with the iteration.

In some embodiments, for each iteration prior to the final iteration in the sequence of iterations, the updating of the current estimate includes sampling additional noise data from a predefined noise distribution. Such embodiments also involve updating the current estimate based on: (i) the additional noise data, and (iii) the noise level parameter associated with the iteration.

In some embodiments, the predicting of the noise data includes estimating actual noise in the noisy image based on the corresponding denoised version of the noisy image.

In some embodiments, the diffusion model is a neural network, and the training of the neural network includes updating one or more current values of a set of parameters of the neural network using one or more gradients of an objective function that measures an error between: (i) the predicted noise data, and (ii) the actual noise data in the noisy target output image. In some embodiments, the error is one of an $L_1$ error or an $L_2$ error.

In some embodiments, the plurality of pairs of images in the training data correspond to each of the plurality of image-to-image translation tasks.

In some embodiments, the plurality of image-to-image translation tasks include one or more of a colorization task, an uncropping task, an inpainting task, a decompression artifact removal task, a super-resolution task, a de-noising task, or a panoramic image generation task.

In some embodiments, the diffusion model is a neural network including one or more self-attention refinement neural network layers.

FIG. 19 is another flowchart of a method 1900, in accordance with example embodiments. Method 1900 may be executed by a computing device, such as computing device 1600. Method 1900 may begin at block 1910, where the method involves receiving, by a computing device, an input image.

At block 1920, the method involves applying a multi-task diffusion model to predict a denoised image by applying a reverse diffusion process, the diffusion model having been trained on a plurality of pairs of images, wherein each pair comprises a noisy image and a denoised version of the noisy image, and the diffusion model having been trained to perform a plurality of image-to-image translation tasks, the training comprising: iteratively generating a forward diffusion process by predicting, at each iteration in a sequence of iterations and based on a current noisy estimate of the denoised version of the noisy image, noise data for a next noisy estimate of the denoised version of the noisy image, updating, at each iteration, the current noisy estimate to the next noisy estimate by combining the current noisy estimate with the predicted noise data, and determining the reverse diffusion process by inverting the forward diffusion process to predict the denoised version of the input image.

At block 1930, the method involves providing, by the computing device, the predicted denoised version of the input image.

In some embodiments, the plurality of image-to-image translation tasks include one or more of a colorization task, an uncropping task, an inpainting task, a decompression artifact removal task, a super-resolution task, a de-noising task, or a panoramic image generation task.

In some embodiments, the input image is a grayscale image, and the predicted denoised version is a colorized version of the grayscale image.

In some embodiments, the input image includes one or more missing interior regions, and the predicted denoised version comprises an inpainting of the one or more missing interior regions.

In some embodiments, the input image includes one or more blurred portions, and the predicted denoised version is a deblurred version of the input image.

In some embodiments, the input image is a cropped image, and the predicted denoised version is an uncropped version of the input image.

In some embodiments, the input image includes one or more decompression artifacts, and the applying of the multi-task diffusion model comprises removing the one or more decompression artifacts.

In some embodiments, the input image includes one or more image distortions, and the applying of the multi-task diffusion model comprises correcting the one or more image distortions.

Figure 20:
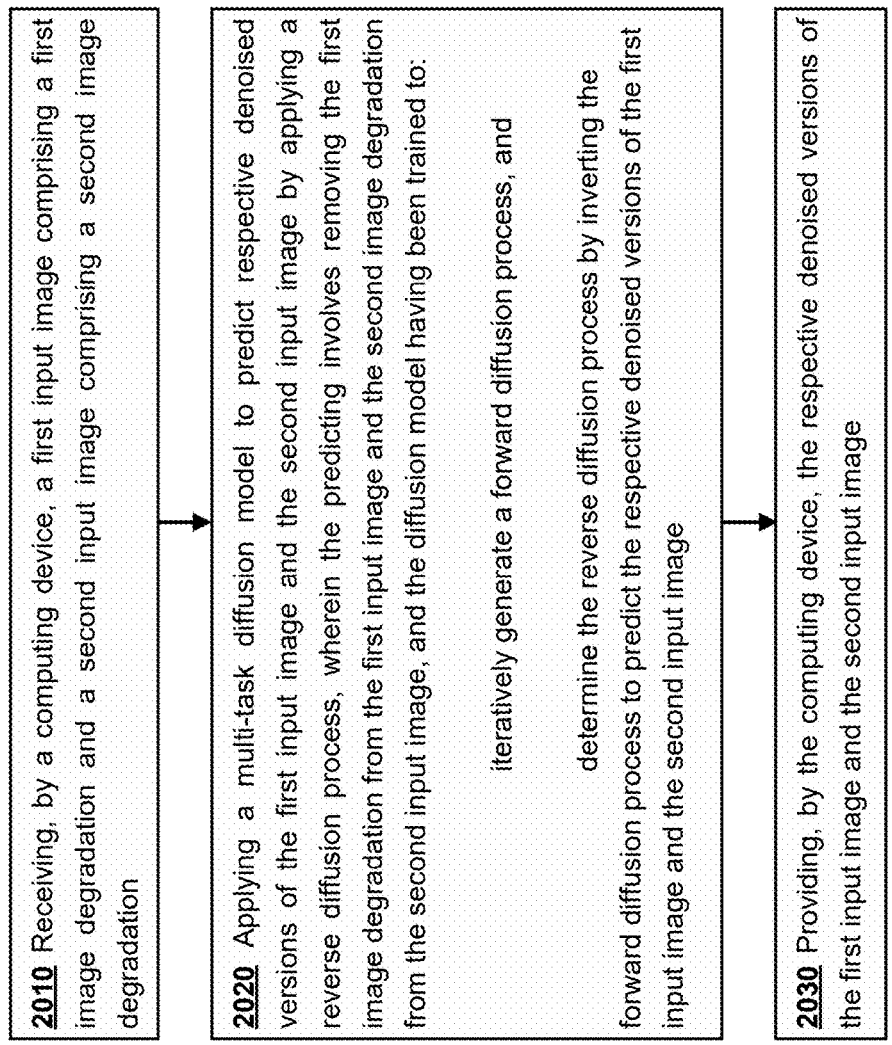
FIG. 20 is another flowchart of a method, in accordance with example embodiments.

FIG. 20 is another flowchart of a method 2000, in accordance with example embodiments. Method 2000 may be executed by a computing device, such as computing device 1600. Method 2000 may begin at block 2010, where the method involves receiving, by a computing device, a first input image comprising a first image degradation and a second input image comprising a second image degradation.

At block 2020, the method involves applying a multi-task diffusion model to predict respective denoised versions of the first input image and the second input image by applying a reverse diffusion process, wherein the predicting involves removing the first image degradation from the first input image and the second image degradation from the second input image, and the diffusion model having been trained to: iteratively generate a forward diffusion process, and determine the reverse diffusion process by inverting the forward diffusion process to predict the respective denoised versions of the first input image and the second input image.

At block 2030, the method involves providing, by the computing device, the respective denoised versions of the first input image and the second input image.

In some embodiments, the first input image comprises one or more missing interior regions, and the predicted denoised version of the first input image comprises an inpainting of the one or more missing interior regions, and the second input image comprises one or more blurred portions, and the predicted denoised version is a deblurred version of the input image is a deblurred version of the second input image.

In some embodiments, the first input image is a cropped image, and the predicted denoised version of the first input image is an uncropped version of the first input image, and the second input image comprises one or more blurred portions, and the predicted denoised version is a deblurred version of the input image is a deblurred version of the second input image.

In some embodiments, the first input image is a cropped image, and the predicted denoised version of the first input image is an uncropped version of the first input image, and the second input image comprises one or more decompression artifacts, and the applying of the multi-task diffusion model comprises removing the one or more decompression artifacts.

In some embodiments, the first input image comprises one or more decompression artifacts, and the applying of the multi-task diffusion model comprises removing the one or more decompression artifacts, and the second input image comprises one or more image distortions, and the applying of the multi-task diffusion model comprises correcting the one or more image distortions.

In some embodiments, the first input image comprises one or more missing interior regions, and the predicted denoised version of the first input image comprises an inpainting of the one or more missing interior regions, and the second input image comprises one or more image distortions, and the applying of the multi-task diffusion model comprises correcting the one or more image distortions.

In some embodiments, the first input image comprises one or more missing interior regions, and the predicted denoised version of the first input image comprises an inpainting of the one or more missing interior regions, and the second input image is a grayscale image, and the predicted denoised version of the second input image comprises a colorization of the grayscale image.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A computer-implemented method, comprising:
 receiving, by a computing device, training data comprising a plurality of pairs of images, wherein each pair comprises a noisy image and a denoised version of the noisy image;
 training, based on the training data, a multi-task diffusion model to perform a plurality of image-to-image translation tasks, wherein the training comprises:
  iteratively generating a forward diffusion process by predicting, at each iteration in a sequence of iterations and based on a current noisy estimate of the denoised version of the noisy image, noise data for a next noisy estimate of the denoised version of the noisy image,
  updating, at each iteration, the current noisy estimate to the next noisy estimate by combining the current noisy estimate with the predicted noise data, and
  determining a reverse diffusion process by inverting the forward diffusion process to predict the denoised version of the noisy image; and
 providing, by the computing device, the trained multi-task diffusion model.

2. The method of claim 1, further comprising:
 sampling, at a first iteration of the sequence of iterations, an initial noise data from a predefined noise distribution.

3. The method of claim 2, wherein the predefined noise distribution is a standard Normal distribution.

4. The method of claim 1, wherein each iteration in the sequence of iterations is associated with a respective noise level parameter, and wherein the predicting of the noise data at each iteration is based on the noise level parameter associated with the iteration.

5. The method of claim 4, wherein for each iteration in the sequence of iterations, the updating of the current noisy estimate to the next noisy estimate is performed by combining the predicted noise data with the current estimate in accordance with the noise level parameter associated with the iteration.

6. The method of claim 4, wherein for each iteration prior to the final iteration in the sequence of iterations, the updating of the current estimate comprises:
 sampling additional noise data from a predefined noise distribution; and
 updating the current estimate based on: (i) the additional noise data, and (ii) the noise level parameter associated with the iteration.

7. The method of claim 1, wherein the predicting of the noise data comprises:
 estimating actual noise in the noisy image based on the corresponding denoised version of the noisy image.

8. The method of claim 7, wherein the diffusion model is a neural network, and the training of the neural network further comprising:
 updating one or more current values of a set of parameters of the neural network using one or more gradients of an objective function that measures an error between: (i) the predicted noise data, and (ii) the actual noise data in the noisy target output image.

9. The method of claim 8, wherein the error is one of an $L_1$ error or an $L_2$ error.

10. The method of claim 1, wherein the plurality of pairs of images in the training data correspond to each of the plurality of image-to-image translation tasks.

11. The method of claim 1, wherein the plurality of image-to-image translation tasks comprise one or more of a colorization task, an uncropping task, an inpainting task, a decompression artifact removal task, a super-resolution task, a de-noising task, or a panoramic image generation task.

12. The method of claim 1, wherein the diffusion model is a neural network comprising one or more self-attention refinement neural network layers.

13. A computer-implemented method, comprising:
 receiving, by a computing device, an input image;
 applying a multi-task diffusion model to predict a denoised version of the input image by applying a reverse diffusion process, the diffusion model having been trained on a plurality of pairs of images, wherein each pair comprises a noisy image and a denoised version of the noisy image, and the diffusion model having been trained to perform a plurality of image-to-image translation tasks, the training comprising:
  iteratively generating a forward diffusion process by predicting, at each iteration in a sequence of iterations and based on a current noisy estimate of the denoised version of the noisy image, noise data for a next noisy estimate of the denoised version of the noisy image,
  updating, at each iteration, the current noisy estimate to the next noisy estimate by combining the current noisy estimate with the predicted noise data, and
  determining the reverse diffusion process by inverting the forward diffusion process to predict the denoised version of the input image; and
 providing, by the computing device, the predicted denoised version of the input image.

14. The method of claim 13, wherein the plurality of image-to-image translation tasks comprise one or more of a colorization task, an uncropping task, an inpainting task, a decompression artifact removal task, a super-resolution task, a de-noising task, or a panoramic image generation task.

15. The method of claim 13, wherein the input image comprises one or more missing interior regions, and the predicted denoised version comprises an inpainting of the one or more missing interior regions.

16. The method of claim 13, wherein the input image comprises one or more blurred portions, and the predicted denoised version is a deblurred version of the input image.

17. The method of claim 13, wherein the input image is a cropped image, and the predicted denoised version is an uncropped version of the input image.

18. The method of claim 13, wherein the input image comprises one or more decompression artifacts, and the applying of the multi-task diffusion model comprises removing the one or more decompression artifacts.

19. The method of claim 13, wherein the input image comprises one or more image distortions, and the applying of the multi-task diffusion model comprises correcting the one or more image distortions.

20. A computer-implemented method, comprising:

receiving, by a computing device, a first input image comprising a first image degradation and a second input image comprising a second image degradation;

applying a multi-task diffusion model to predict respective denoised versions of the first input image and the second input image by applying a reverse diffusion process, wherein the predicting involves removing the first image degradation from the first input image and the second image degradation from the second input image, and the diffusion model having been trained to:
iteratively generate a forward diffusion process, and
determine the reverse diffusion process by inverting the forward diffusion process to predict the respective denoised versions of the first input image and the second input image; and providing, by the computing device, the respective denoised versions of the first input image and the second input image.

21. The method of claim 20, wherein:
the first input image comprises one or more missing interior regions, and the predicted denoised version of the first input image comprises an inpainting of the one or more missing interior regions, and
the second input image comprises one or more blurred portions, and the predicted denoised version is a deblurred version of the input image is a deblurred version of the second input image.

22. The method of claim 20, wherein:
the first input image is a cropped image, and the predicted denoised version of the first input image is an uncropped version of the first input image, and
the second input image comprises one or more blurred portions, and the predicted denoised version is a deblurred version of the input image is a deblurred version of the second input image.

23. The method of claim 20, wherein:
the first input image is a cropped image, and the predicted denoised version of the first input image is an uncropped version of the first input image, and
the second input image comprises one or more decompression artifacts, and the applying of the multi-task diffusion model comprises removing the one or more decompression artifacts.

24. The method of claim 20, wherein:
the first input image comprises one or more decompression artifacts, and the applying of the multi-task diffusion model comprises removing the one or more decompression artifacts, and
the second input image comprises one or more image distortions, and the applying of the multi-task diffusion model comprises correcting the one or more image distortions.

25. The method of claim 20, wherein:
the first input image comprises one or more missing interior regions, and the predicted denoised version of the first input image comprises an inpainting of the one or more missing interior regions, and
the second input image comprises one or more image distortions, and the applying of the multi-task diffusion model comprises correcting the one or more image distortions.

26. The method of claim 20, wherein:
the first input image comprises one or more missing interior regions, and the predicted denoised version of the first input image comprises an inpainting of the one or more missing interior regions, and
the second input image is a grayscale image, and the predicted denoised version of the second input image comprises a colorization of the grayscale image.

* * * * *